(12) United States Patent
Lynch et al.

(10) Patent No.: US 11,868,374 B2
(45) Date of Patent: Jan. 9, 2024

(54) USER DEGREE MATCHING ALGORITHM

(71) Applicant: Pearson Education, Inc., Bloomington, MN (US)

(72) Inventors: Jay Lynch, Arvada, CO (US); Reuben N. Kelly, Orlando, FL (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 15/930,904

(22) Filed: May 13, 2020

(65) Prior Publication Data

US 2021/0357428 A1 Nov. 18, 2021

(51) Int. Cl.
*G06F 16/00* (2019.01)
*G06F 16/28* (2019.01)
*G06F 16/23* (2019.01)
*G06F 16/25* (2019.01)

(52) U.S. Cl.
CPC ........ *G06F 16/285* (2019.01); *G06F 16/2379* (2019.01); *G06F 16/252* (2019.01)

(58) Field of Classification Search
CPC ... G06F 16/285; G06F 16/252; G06F 16/2379
USPC ................................................ 707/600–899
See application file for complete search history.

(56) References Cited

U.S. PATENT DOCUMENTS

| 11,151,672 | B2 * | 10/2021 | Terra | .................. | G06Q 50/2053 |
| 2011/0270684 | A1 * | 11/2011 | Holtzman | .............. | G06Q 30/02 |
| | | | | | 705/14.66 |
| 2015/0161631 | A1 * | 6/2015 | Kimmerling | ........... | G06F 16/24 |
| | | | | | 705/14.66 |

\* cited by examiner

*Primary Examiner* — Irete F Ehichioya
*Assistant Examiner* — Shirley D Hicks
(74) *Attorney, Agent, or Firm* — Quarles & Brady LLP

(57) ABSTRACT

Systems and methods of the present invention provide for: generating a GUI comprising survey questions associated with degree factors and associated rating GUI components indicating application of the factor to a user; receiving the factor rating for each survey question; identifying a high factor rating exceeding a threshold; selecting a degree identifier sharing a common high factor rating between the first response and a response stored in the database; generating a candidate degree list including the degree identifier; generating a second GUI including the candidate degree list; and transmitting the second GUI to a client device.

20 Claims, 15 Drawing Sheets

FIG. 5

Matching Assessment

Affective Match | Cognitive Match | Lifestyle | Qualifications

Interests

|   | Strongly Disagree | | | | Strongly Agree |
|---|---|---|---|---|---|
| 1. Develop a new medicine | ○ | ○ | ● | ○ | ○ |
| 2. Create a computer program | ● | ○ | ○ | ○ | ○ |
| 3. Help people with personal or emotional problems | ○ | ○ | ○ | ● | ○ |
| 4. Give career guidance to people | ○ | ○ | ○ | ● | ○ |
| 5. Work in law enforcement | ○ | ○ | ○ | ○ | ○ |

Motivations

1. Have a strong need for power ○ ○ ○ ○ ○
2. Am committed to principles of justice and equality ○ ○ ○ ○ ○
3. Want to surpass others' accomplishments ○ ○ ○ ○ ○
4. Want to help others ○ ○ ○ ○ ○
5. Feel it's important to live in a world of beauty ○ ○ ○ ○ ○

Next Page >

Matching Assessment

Affective Match | Cognitive Match | Lifestyle | Qualifications

Personality

Strongly Disagree — Strongly Agree

1. Accomplish my work on time  ○ ○ ○ ○ ○
2. Dislike being the center of attention  ○ ○ ○ ○ ○
3. Get stressed out easily  ○ ○ ○ ○ ○
4. Start conversations  ○ ○ ○ ○ ○
5. Am interested in people  ○ ○ ○ ○ ○

Learning Preferences

1. Enjoy studying with peers  ○ ○ ○ ○ ○
2. Like the challenge of problems without clear solutions  ○ ○ ○ ○ ○
3. Need guidance from an instructor to stay on track  ○ ○ ○ ○ ○
4. Am thrilled when I learn something new  ○ ○ ○ ○ ○
5. Test myself on information I'm trying to learn  ○ ○ ○ ○ ○

Next Page >

Degree Match

| Affective Match | Cognitive Match | Lifestyle | Qualifications |

Educational Information

1. Highest Degree Earned [Bachleor's Degree ▼]

What Was Your Degree? [Psychology]

2. College GPA [3.3]

3. High School GPA [3.7]

4. Have you taken any graduate level tests (e.g. GRE, LSAT)? [None Taken ▼]

Professional Experience

1. Do you have any licenses or certificates? [No ▼]

2. Years of full-time professional work experience [ ]

[Find My Best Degree Matches]

USER DEGREE MATCHING ALGORITHM

FIELD OF THE INVENTION

This disclosure relates to the field of systems and methods configured to provide a guide for prospective students in making optimal decisions about pursuing degrees or degree programs, specifically systems and methods for receiving user data, and matching the user data to factors associated with degrees or degree programs in which students indicated high levels of success and satisfaction.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: store, within a database, multiple degree factors, multiple survey questions, each associated with one of the degree factors, and a factor rating threshold. The system, specifically a server, may further generate a first Graphical User Interface (GUI) including a degree selection GUI component, one or more of the survey questions, and a factor rating GUI component for each of the survey questions. The factor rating GUI component may receive input including a factor rating indicating a level to which the degree factor applies to a user.

The server may transmit the first GUI to a client device, and receive, from the client device, a response comprising a degree identifier and the factor rating for each of the plurality of survey questions. The server may then identify, within the response, at least one high factor rating. This high factor rating is determined according to the factor rating exceeding the factor rating threshold. The server may then store the at least one high factor rating and the degree identifier in association in the database.

The server may then generate a second GUI comprising one or more of the survey questions and the factor rating GUI component for each of the questions, transmit the second GUI to a second client device, receive, from the second client device, a second response including the factor rating for each of the plurality of survey questions.

Using the received input from the second GUI, the server may again identify, within the second response, the at least one high factor rating, and execute a database command selecting at least one degree identifier, including the degree identifier identified by the first client device, and sharing at least one common high factor rating between the first response and the second response. The server may then generate a candidate degree list including the at least one degree identifier, generate a third GUI including the candidate degree list, and transmit the third GUI to the second client device.

The above features and advantages of the present invention will be better understood from the following detailed description taken in conjunction with the accompanying drawings.

BRIEF DESCRIPTION OF THE DRAWINGS

FIG. 5 illustrates a non-limiting example user interface for identifying factors related to a user's interests and motivations.

FIG. 6 illustrates a non-limiting example user interface for identifying factors related to a user's personality and learning preferences.

FIG. 7 illustrates a non-limiting example user interface for identifying factors related to a user's mindset and cognitive ability.

FIG. 8 illustrates a non-limiting example user interface for identifying factors related to a user's lifestyle.

FIG. 9 illustrates a non-limiting example user interface for identifying factors related to a user's qualifications.

FIG. 12 illustrates a non-limiting example user interface for filtering a list of degrees.

FIG. 14 illustrates a non-limiting example user interface for displaying a list of matching degree program recommendations, and filtering the list of degree program recommendations.

DETAILED DESCRIPTION

Figure 1:
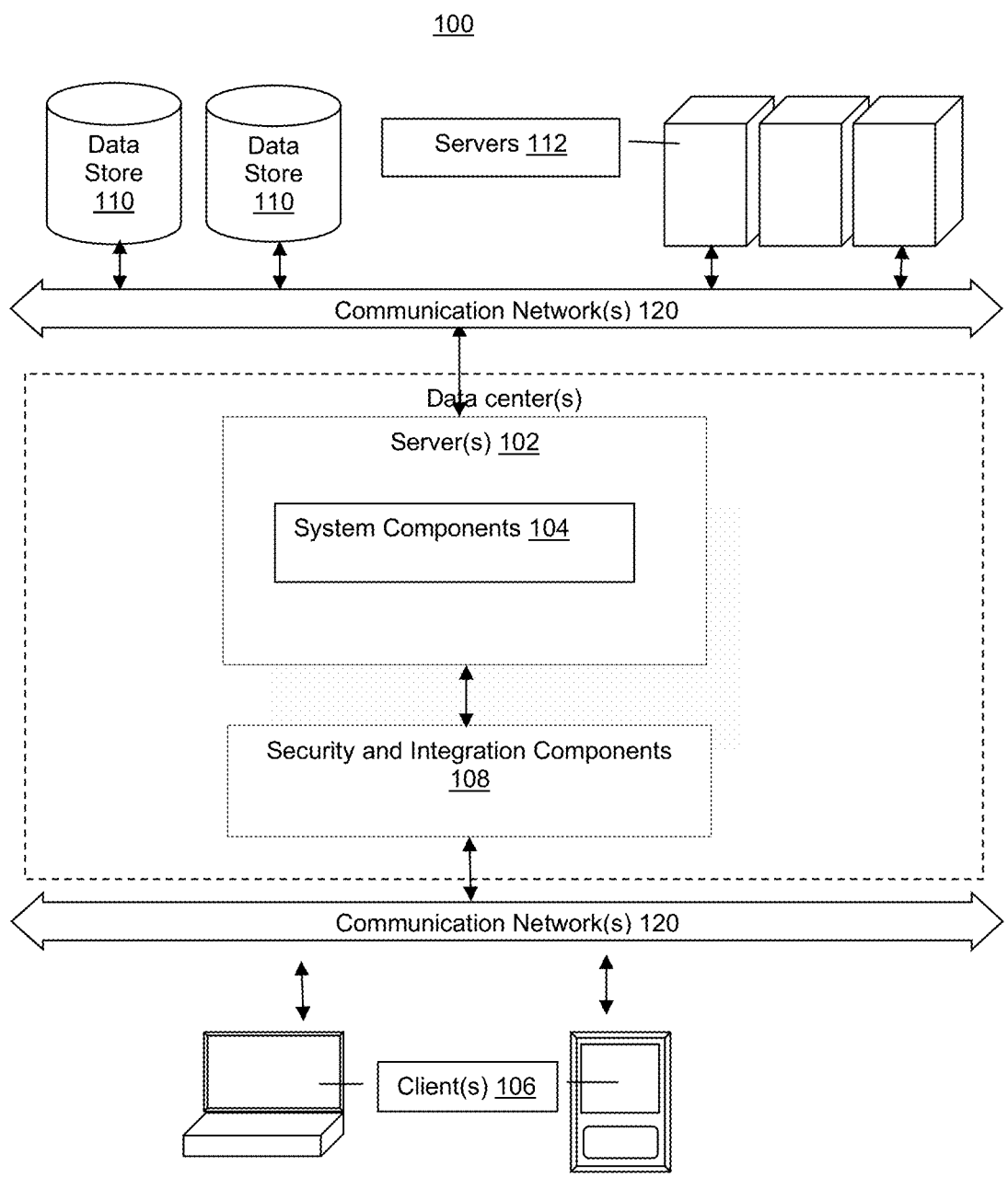
FIG. 1 illustrates a system level block diagram for a user degree matching system and method.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Each year, students try to determine the best degree, degree program, or other academic or career program for them to pursue, due to the impact that it will have on accomplishing their professional goals and shaping their life. Unfortunately, research suggests that people are notoriously poor decision-makers when faced with complex decisions such as selecting a degree and associated programs. Specifically, people tend to overestimate their abilities, be swayed by irrelevant biases, and fail to weigh disparate information sources objectively. When students are forced to switch or drop out of programs that are not good academic or cultural fits, the subsequent cost in time and money is significant.

Unfortunately, there is no existing technology that provides students with degree and program recommendations based on research-informed multi-factor student profiles, nor does existing technology claim to have validated the predictive quality of their recommendations with respect to student success and satisfaction. Currently existing resources for acquiring guidance to aid students in making these decisions are poor and almost impossible to find. Specifically, resources and tools for helping students select a degree and associated program overwhelmingly rely on narrow and superficial inputs driven by anecdotal and predictively-unsubstantiated relationships.

For example, students who work with guidance counselors, seeking advice on a major or career, may provide the guidance counselor with an overestimation of their own ability, and fail to understand what kind of expectations, skills, or aptitudes are reflected in different disciplines. In addition, guidance counselors may have very limited knowledge about the expectations and the skills required for incoming students in order to recommend a degree or program, may have little or no knowledge of existing programs, and/or may not have the ability to assess incoming students' cognitive ability.

Existing commercial resources and tools may claim to aid students in selecting a degree and program, but they have the following weaknesses: they rely on narrow, brief, and unreliable surveys; they provide recommendations on the basis of unsubstantiated and unscientific relationships between student responses and job/degree qualifications; and they lack any evidence that their recommendations have predictive validity when it comes to student success or satisfaction.

In short, existing solutions rarely extend beyond simple measures of student academic performance, ignoring the equally important non-cognitive, personality, and aspirational factors that research shows strongly determine student success and satisfaction in their choice of degree. Furthermore, existing solutions cannot be generalized outside the confines of the particular university or school where they are being developed. In other words, it is becoming increasingly difficult for learners to find a good degree and/or program fit, because none of the available solutions include a validated method for successfully recommending degrees or their related programs to prospective or returning college students or individuals looking to advance in their career.

Unlike currently available resources to help students select a degree and associated program (tools that overwhelmingly rely on narrow and superficial inputs driven by anecdotal and predictively-unsubstantiated relationships), the disclosed embodiments elicit key factors from a student, and use a machine learning algorithm designed to effectively and reliably guide prospective students in making optimal decisions about what degrees/programs to pursue.

The disclosed embodiments use factors selected on the basis of comprehensive research and continuously improved and updated data, which are weighted based on their predictive strength. The disclosed embodiments then use a validated model to match a student's unique profile of experiences, aptitudes, skills, goals, and preferences to degrees and associated degree programs by identifying recommendations intended to maximize both the probability that a student will successfully complete a given degree program (e.g., student has requisite socio-emotional and cognitive skills) as well as their satisfaction in the decision (i.e., enjoyment of degree program and subsequent career path).

As a result, the disclosed embodiments may improve students' or other users' academic and career path in the following ways: 1. They will experience a greater likelihood of success, enjoyment, and increased motivation when selecting a degree, making their decision more informed and satisfying; 2. By using the tool and reviewing their results on the associated factors, users can gain deeper insights into their key academic strengths and weakness; they can also learn about ways to improve their skills, acquire new strategies, and think about their academic motivations; 3. The disclosed embodiments will enable the collection of valuable student data that universities could use to develop more holistic approaches to measuring and evaluating incoming degree-seeking students' readiness, allowing them to augment student grades and standardized tests scores with additional non-cognitive/aspirational/motivational factors; and 4. Sharing the data with partnering degree programs could also provide additional information on student readiness that empowers schools to target certain students with tailored supports and resources to better ensure their success.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
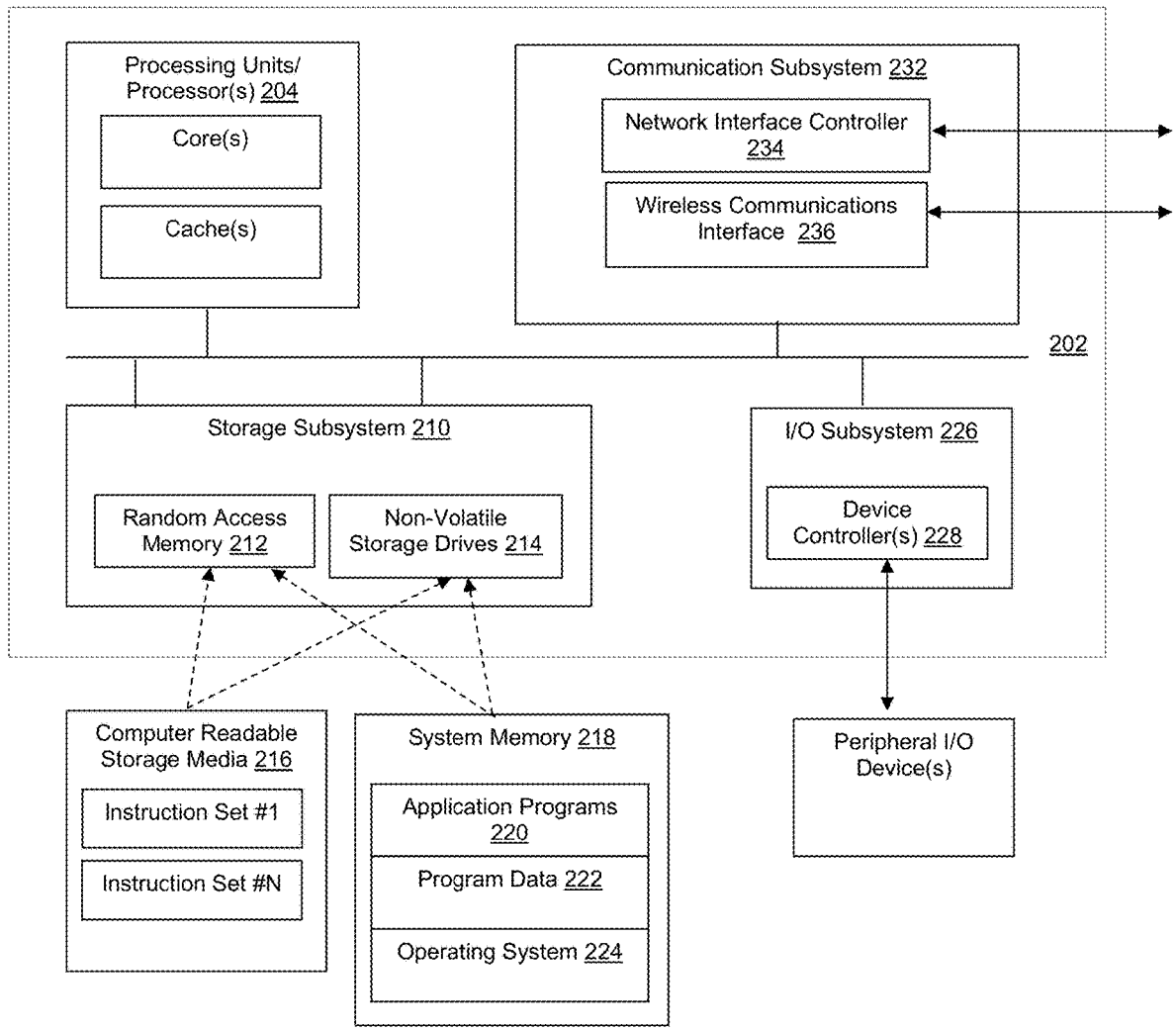
FIG. 2 illustrates a more detailed view of the system level block diagram for a user degree matching system and method.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

In the interest of simplicity, the disclosed embodiments refer to server 102 in association with various algorithms, software instruction execution, method steps, etc. disclosed herein. However, it should be understood that these algorithms, software instruction execution, method steps, etc. may be executed using any combination of computing devices or other hardware or software within the disclosed system. As non-limiting examples, such algorithms, instructions, or method steps may be performed entirely by server 102, by a cluster of server computers 112, entirely by client 106, or by any combination thereof.

The disclosed embodiments include an algorithm designed to match a user to his or her optimal major, degree/certificate, academic program, and/or career path program based on the user's unique signature of cognitive, affective, and socio-emotional degree factors, which include life priorities, academic aptitude, interests, learning preferences, etc., while also taking into consideration important degree and program-related features. The disclosed algorithm is comprised of two functionalities: a prediction function and a filtering function, both described in greater detail below.

The disclosed embodiments use categories, characteristics, and other degree-related factors, referred to generally as factors or degree factors herein, that are specifically configured to determine a degree that is a best match for system users, such as students. Unlike profiles based on as HBDI (Hermann Brain Dominance Instrument), identifications of color based on the user's personality, DISC (Dominant, Inspiring, Supportive, Cautious) profiles, etc. (which are popular among sales groups, but have little if any value for efficiently identifying ideal degrees or degree programs for students or other users), the disclosed embodiments receive data from a foundational level, by identifying the degree factors associated with previous users who have been successful, and are satisfied with their degrees or degree programs, in order to find and establish a much more efficient validated mapping of current or future users to majors, degrees, specific degree programs, career paths/programs, etc. according to a predictively valid model, thereby allowing the disclosed embodiments to accurately predict outcomes based on the factor input from current or prospective users.

Thus, as a preliminary step, one or more stakeholders in higher education, such as one or more system administrators, one or more college professors, one or more individuals with extensive expertise in identifying recommended majors, degree, and/or career programs, etc. may perform an extensive review of relevant research literature (e.g., doctoral data) associated with majors, degrees, degree programs, career programs, etc., in order to determine an optimal degree or degree program for incoming students based on the identified degree factors.

As a non-limiting example, the disclosed embodiments may include research based on interviews, leadership input, and research reviews of relevant research data In order to provide and analyze degree-related data. The leadership input or interviews used to gather the relevant data for providing optimal majors, degrees, and/or programs for prospective students may include interviews with key academic or other stakeholders. The system administrators may interview these individuals to identify optimal programs for specific individuals.

After an extensive review of the relevant academic, research, interview, or other literature or resources, the system administrators (e.g., the stakeholders described above) may then perform an extensive analysis of the aggregated data to identify one or more key categories, characteristics, and/or any other robust key factors (referred to as factors or degree factors herein), that are significant in matching students to their optimal majors, degrees and/or programs. As noted herein, these key factors may be determined according to previous users' success and satisfaction, or dissatisfaction and attrition. In other words, these key factors may be determined based on the research data or data gathered from students who have previously completed the majors/degrees under consideration and/or their associated programs.

The disclosed embodiments define the following non-limiting example factors, which may be used as the key factors which map a student's personal profile to a specific degree and/or degree program: interests/occupational interests (e.g., enterprising, artistic, social); motivations/life aspirations (motivated for wealth, motivated to help others, motivated by justice); personality (e.g., openness to experience, extraversion, conscientiousness); learning preferences (e.g., collaboration, study-skills, meta-cognition); thinking style (e.g., creativity, conservatism, problem-solving); mindset (e.g., self-efficacy, perseverance, goal-setting); aptitude (e.g., academic ability, verbal/spatial reasoning, achievement) lifestyle (e.g., family, income, culture); and qualifications (e.g., educational information, professional experience). Details regarding the example categories, characteristics, and factors will be explored in more detail herein.

In some embodiments, the system administrators may access a software configured to receive input from the system administrators relating to one or more identified degrees, the details for the degrees, one or more degree programs, and the details for the degree programs. The software may include a Graphical User Interface (GUI, not shown) configured to receive this information, described in more detail below, from the system administrators.

Using this GUI, the system administrators may input, possibly via and one or more degree identifier GUI components, data identifying one or more degrees that users may select as a degree which they have completed, are currently enrolled in, or are interested in pursuing, as described in detail below. As non-limiting examples, the degree identifier for each degree may include a name of the degree, or a unique identifier, such as an integer automatically generated and auto-incremented by a database, and associated with a data record for the degree, as non-limiting examples.

Figure 11:
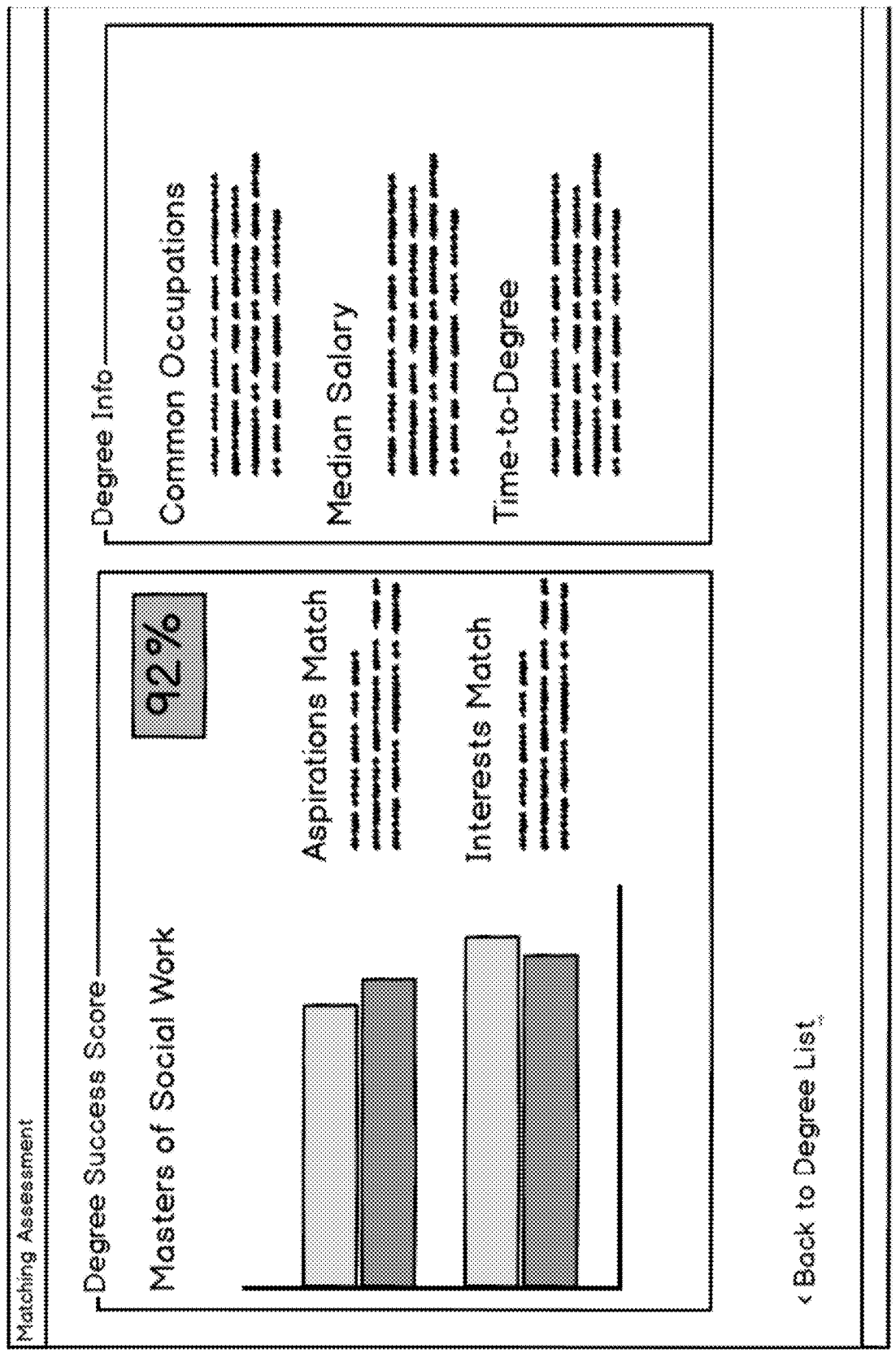
FIG. 11 illustrates a non-limiting example user interface for displaying additional information about a selected degree.

The system administrators may further input into the GUI, possibly using the at least one GUI component, degree detail information, such as that seen in FIG. 11 as a non-limiting example, to be associated with the degree identifier. The system administrators may further input, into the GUI, a means for accessing the degree details or other information (e.g. a hyperlink or network location), allowing one or more users to access the additional degree details or information.

Figure 12:
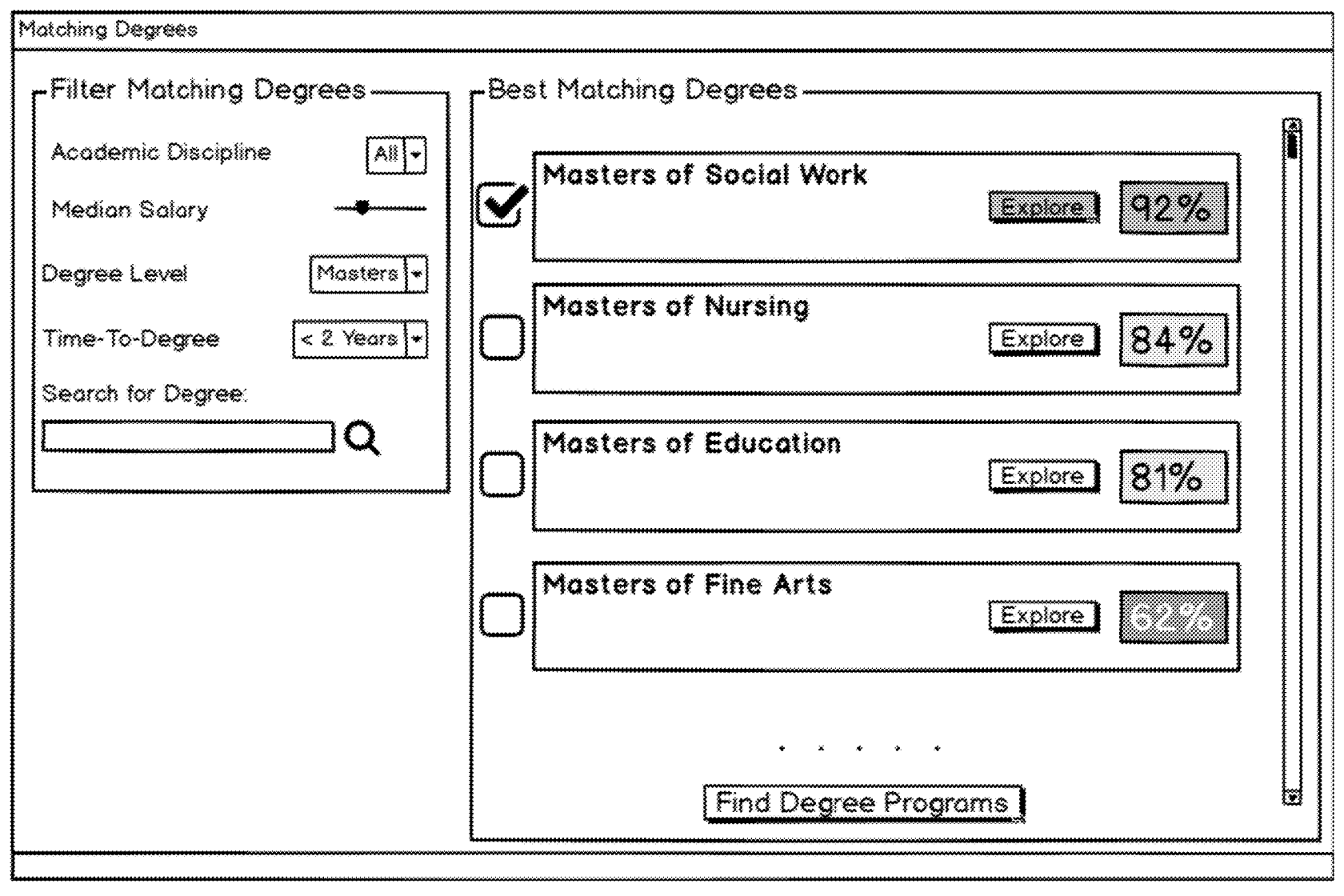

The system administrators may further input, possibly using the at least one GUI component, degree filter factors/ information to be associated with the degree identifier, so that the user may select one or more filters in order to find a matching degree, based on the selected filters. As non-limiting examples, the degree filter factors/information may define user preferences for academic discipline, median salary, degree level, time to degree, and a search for a specific degree, as seen in FIG. 12.

The disclosed system, possibly a degree information administration software running on server 102 may receive the degree identifiers, the additional degree information, the location of the additional degree details or information, and/or the degree filter factors/information, and store them in association in data store 110.

The GUI, or a separate GUI (not shown), may further receive input from the system administrators, possibly via at least one degree factor GUI component, defining a degree factor identifier (e.g., name or unique identifier) for each of the degree factors identified within the research described above, and to be used in determining which degree factors are indicative of success when associated with each degree. The disclosed system, possibly the degree information administration software may receive the degree factors, and store them in data store 110.

The GUI, or a separate GUI (not shown), may further receive input from the system administrators, possibly via at least one degree factor related survey question GUI component, including one or more survey questions to be asked of each previous, current, or future user, in order to determine the degree factors that determine the success and satisfaction associated with a degree or its associated program for users previously or currently enrolled in such a degree program, and/or to identify the factors that will determine the best degree for users that are considering which program to enroll in. Non-limiting examples of such questions are demonstrated throughout FIGS. 5-9. The factor question GUI may further include one or more factor identifier selection GUI components, allowing the system administrator to associate an input question with a degree factor identifier described above.

The disclosed system, possibly a degree information administration software running on server 102, may receive the input degree factor survey questions and the associated factor identifier, and store them in association in data store 110.

In some embodiments, the GUI may include one or more threshold input GUI components. As a non-limiting example, in some embodiments, based on the research above, the system administrator may input a threshold for degree satisfaction, where only the data from those previous or current students who have indicated a highly rated degree of success and satisfaction with their degrees will be considered in generating the model described below to predict the likelihood of success of future students.

Similarly, based on the research described above, the system administrator may input a threshold for each of the degree factor survey questions and/or degree factor identifiers, in order to determine whether a response to the factor question indicates a likelihood of success and satisfaction associated with the degree. The use of this threshold will be described in more detail below. As a non-limiting example, the threshold may determine whether the degree factor associated with the user, which the user agrees or disagrees is relevant to the user, is considered "highly rated" according to the user response to the survey question. In this example, and as described in more detail below, a user's rating of a degree factor being equal to a 4 or 5 (indicating that the user strongly agrees), may exceed the required threshold. The threshold for each degree factor determined from each response to a survey question may be stored in data store 110 in association with the appropriate degree factor survey question and/or factor identifier.

Using the GUI, or a separate GUI (not shown), the system administrators may input, possibly via one or more degree program identifier GUI components, data identifying one or more degree programs that users may select as they are exploring the degrees that are an optimal match for their personality and skills, as described in detail herein. As non-limiting examples, the degree program identifier for each degree program may include a name of the degree program, or a unique identifier, such as an integer automatically generated, auto-incremented, and/or associated with a data record for the degree program. The GUI may further include a degree selection GUI component, allowing a user to select a degree associated with each degree program.

Figure 14:
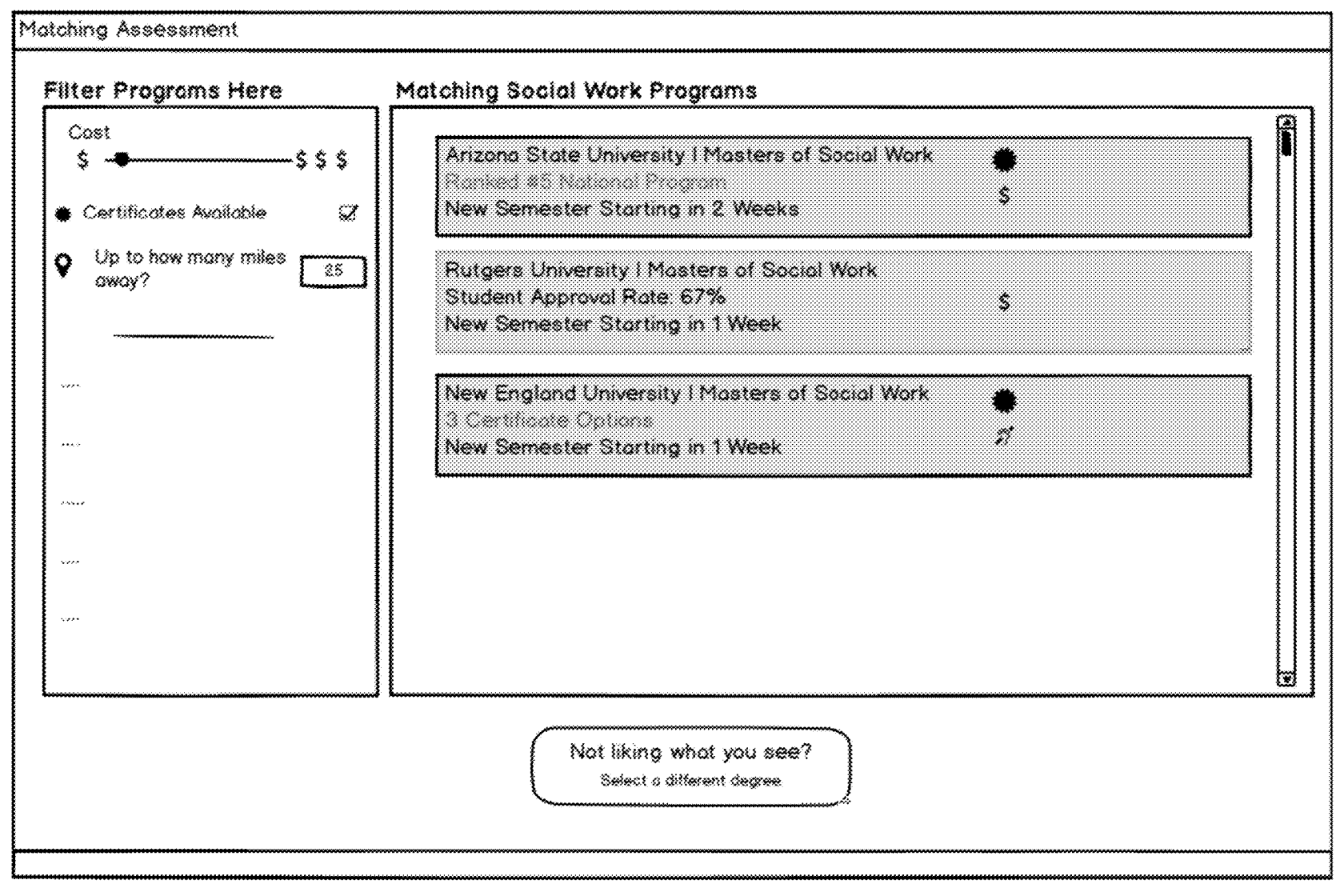
Figure 15:
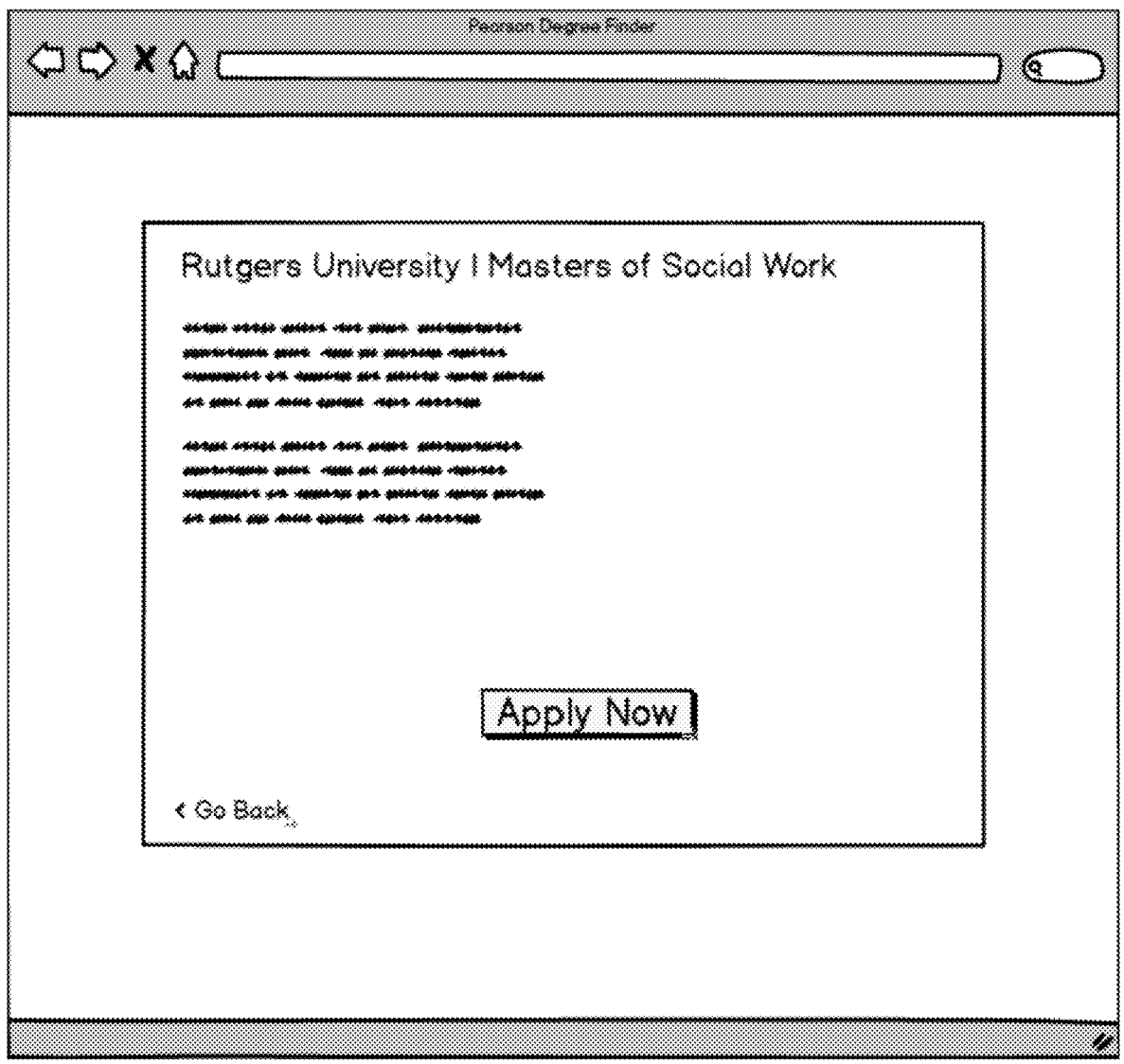
FIG. 15 illustrates a non-limiting example user interface for applying to a selected degree program.

The system administrators may further input, again using at least one GUI component within the GUI or a separate GUI, degree program information to be associated with the degree program identifier, as well as a means for accessing the degree program information (e.g. a hyperlink or network location), so that the user may access the additional degree program information, as seen in FIGS. 14-15, as non-limiting examples.

The system administrators may further input, possibly using the at least one GUI component, degree program filter factors/information to be associated with the degree program identifier, so that the user may select one or more filters in order to find a matching degree program, based on the selected filters. As non-limiting examples, the degree program filter factors/information may define financial considerations, such as a range of costs that a user would identify as a good match (e.g., tuition less than $x.00 per semester), or geographic considerations that would be agreeable to the user (e.g., a college within x miles), as seen in FIGS. 14-15.

The disclosed system, possibly the degree information administration software may receive the degree program identifiers, the additional degree program information, the location of the additional degree program information, and the degree program filter factors/information, and store them in association in data store 110.

Using the analyzed, identified, and stored degree identifiers and their associated degree factors and degree factors questions, the system administrators may further gather and aggregate, within data store 110, data from prior students who have completed the identified major, degree, or career programs, and/or students currently enrolled in these programs. This data may be gathered and aggregated by conducting a study provided to and generated by responses from students. This data generated from the students may include the program that they have completed (or are currently enrolled in), an indication of the level of success and satisfaction they feel resulted in completing this program, and one or more responses to the survey questions used to identify the degree factors. The predictive algorithm outlined below may use this data to identify the degree factors personalized to each user that indicate success and satisfaction in the program.

In some embodiments, described in more detail below, additional data may be aggregated from sources such as the students' social media accounts, academic records, results from related or unrelated software assessments, etc. in order to determine the user's degree and level of success or satisfaction with the degree. Any combination of the survey and this additional data may be used to determine the factors that contributed to the student's success and satisfaction.

As the survey includes questions used to determine the user's success and/or satisfaction with the program, it should be noted that these terms, as used within the disclosed embodiments, includes a success level that resulting from the major/degree they selected, but also includes a level of satisfaction associated with the major/degree, the program itself, and/or the career options that resulted from them. In other words, success and satisfaction, as used herein, may include not just completing the program, but also completing it, being gainfully employed, and being satisfied with that employment as a consequence of the user's educational experience.

The disclosed system may provide the survey to users within programs who have completed, or are currently majoring in specific degrees, to determine the identified factors that most influence success and satisfaction associated with the degree. In some embodiments, this survey may include the survey questions, resulting from the research of system administrators described above, which are specifically created and used to identify specific factors for the user taking the survey.

As a preliminary step to providing this survey, the disclosed system may generate one or more survey GUIs to be transmitted through network 120 to one or more users. These GUIs may be similar to those seen in FIGS. 4-9, but may also include GUI components for receiving input identifying a degree identifier for the user, and an indication of a level of success or satisfaction associated with the degree, described in more detail below.

In some embodiments, in order to generate the GUIs, the disclosed system may select, from data store 110, the survey questions generated by the system administrators in the description above. These survey questions may be grouped according to a category associated in data store 110 with the survey questions, and the system may generate, within each of the GUIs, one or more tabs. As non-limiting examples seen in FIGS. 4-9, the categories/tabs may include "Affective Match," "Cognitive Match," "Lifestyle," and "Qualifications."

In some embodiments, generating the GUIs may further include further grouping the survey questions according to subcategories associated in the database with the survey questions and the identified categories, and generating, within each of the GUI tabs, one or more subcategory subsections within the tabs, for displaying the associated survey questions. As non-limiting examples seen in FIGS. 4-9, the subcategories associated with the Affective Match tab may include "Interests" and "Motivations," the subcategories associated with the Cognitive Match tab may include may include "Personality," "Learning Preferences," "Mindset," and "Cognitive Ability," the Lifestyle tab may include a single "Lifestyle" subcategory, and the subcategories associated with the Qualifications tab may include "Educational Information" and "Professional Experience."

The user may engage with the survey by inputting responses. The responses provided may identify the user's unique signature of cognitive, affective, and socio-emotional factors described herein, and determine associated important degree-related factors. The disclosed system may then use the user's survey responses to collect information about the user, specific to the non-limiting example key factors described herein.

Figure 3:
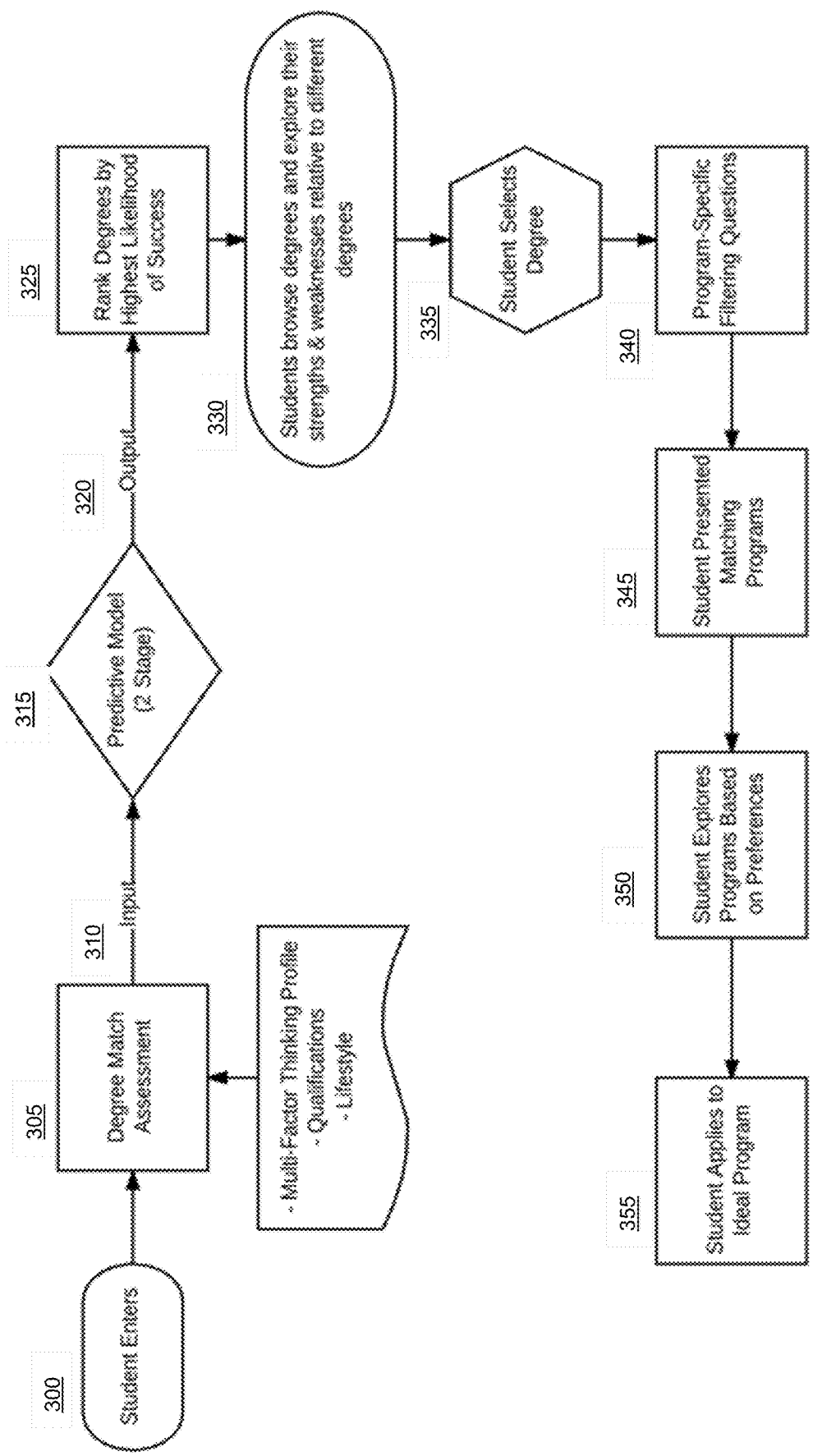
FIG. 3 illustrates a flow chart including the method steps executed by a user degree matching system and method.
Figure 4:
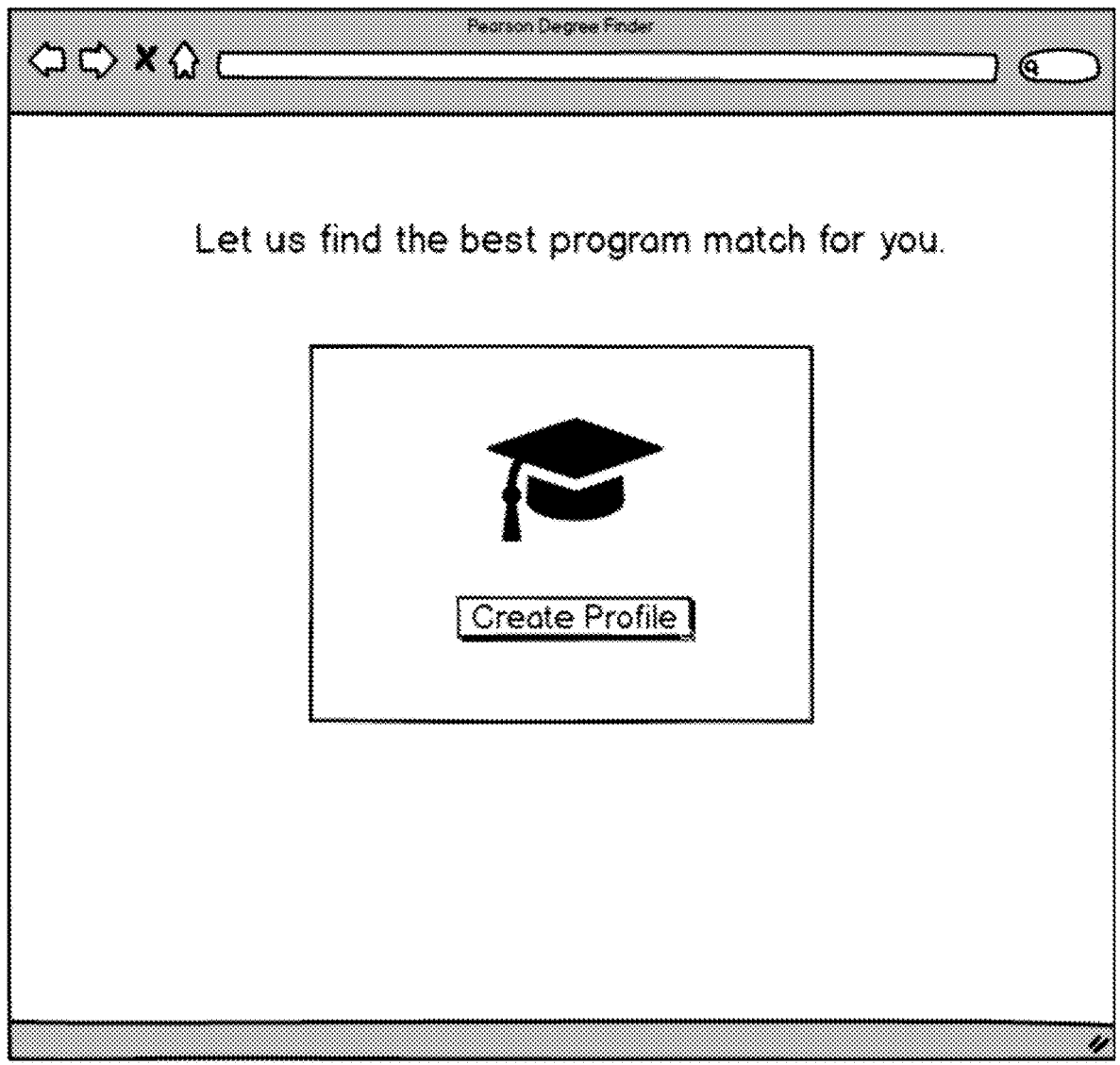
FIG. 4 illustrates a non-limiting example user interface allowing a user to create a profile identifying factors related to the user.

Turning now to FIG. 3, steps 300 and 305 of FIG. 3, in conjunction with FIGS. 5-9, demonstrate a non-limiting example of flowchart steps and a series of wireframes/screenshots illustrating an example of a software tool that presents the survey questions to users that have completed, or are currently completing a degree, and collects data from the user, as described below. In step 300, the student may enter the survey, possibly by accessing an associated software, web page, etc.

Turning now to step 305 of FIG. 3, the user may access and take a degree success/satisfaction and/or degree recommendation assessment, referred to herein as a survey. FIGS. 5-9 demonstrate a series of questions used to determine the factors for the user. As seen in FIGS. 5-9, the user interface for these questions may reflect the categories, subcategories, tabs, and subsections described above.

Figure 7:
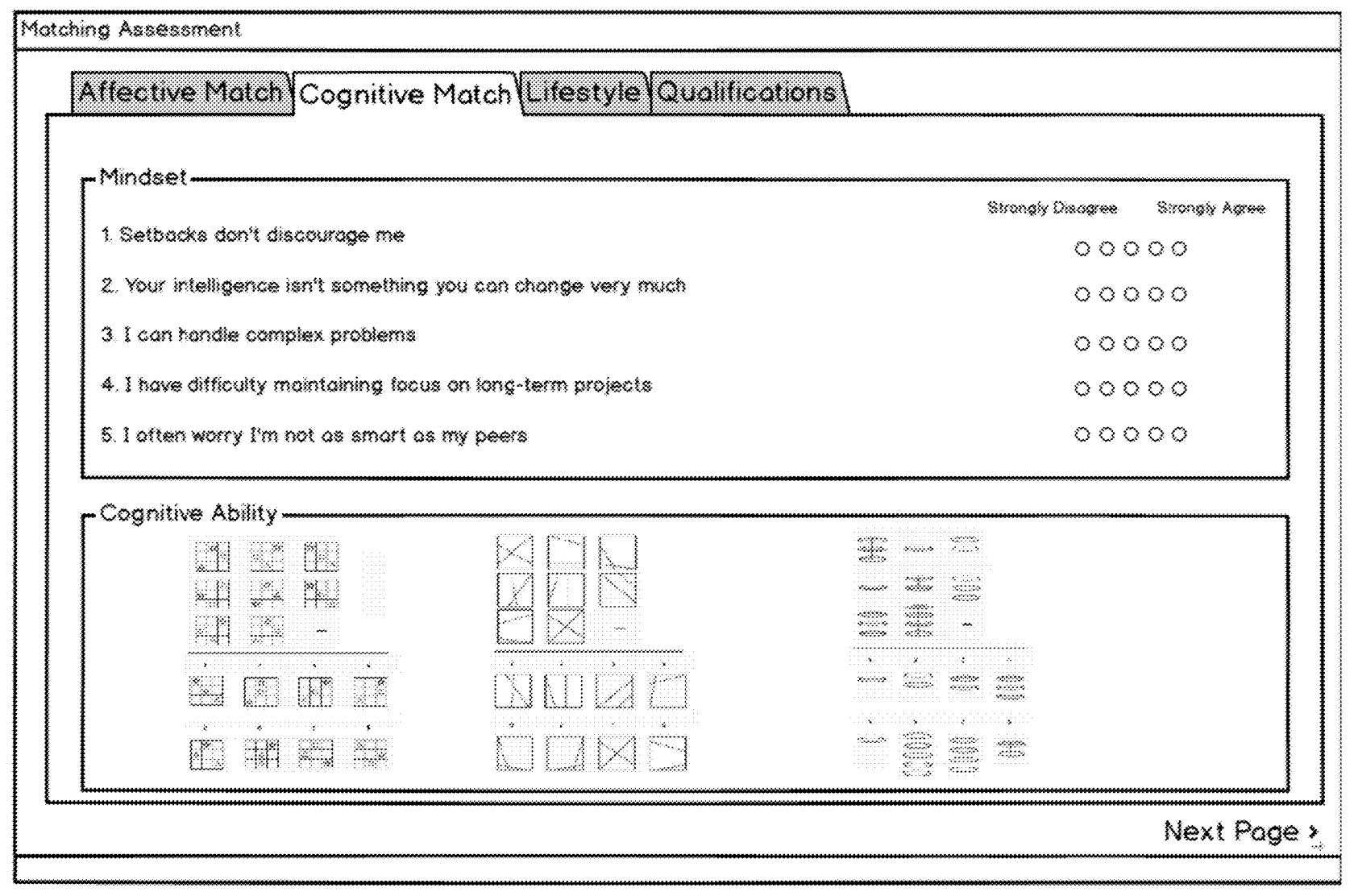

As further seen in FIGS. 5-9, each of the survey questions may be associated with the categories or subcategories, and may further be associated in data store 110 with specific factors, as set forth above. Users may respond to each of the survey questions using a set of radio buttons, as shown in FIGS. 5-7. When a specific radio button is selected by the user, the user may select a rating, indicating whether they strongly agree, strongly disagree, or identify the factor as between strongly agreeing and strongly disagreeing, with the question.

The selection of one of these radio buttons may reflect a user's rating, indicating whether the user believes that the factor (associated with the survey question in data store 110) applies to the user. Thus, the GUI may include a factor rating GUI component receiving, from a user, a rating indicating a level at which the factor applies to the user.

For example, FIGS. 5-7 demonstrate a "multi-factor thinking profile" that includes survey questions specifically configured to determine the factors associated with the user, which define a profile for how the user thinks. In the non-limiting example embodiments shown in FIGS. 5-7, the questions and subcategories associated with the multi-factor thinking profile include the "Affective Match" and "Cognitive Match" tabs.

The Affective Match tab in the non-limiting example embodiment shown in FIG. 5 includes subcategories including the interests and/or occupational interests subcategory, and the life aspirations and/or motivations subcategory.

As seen in FIG. 5, the interests/occupational interests subcategory may include one or more questions used to determine interests and/or occupational interests for the user. The following table demonstrates the associated interests/occupational interest factors (e.g., enterprising, artistic, social), which may include the following constructs and definitions for the factors associated with the user's interests/occupational interests: realistic, indicating that the user is interested in jobs that that require use of tools, machines, or physical skills; investigative, indicating that the user is Interested in jobs that involve theory, research, and scientific inquiry; artistic, indicating that the user is interested in jobs that involve creativity, originality, and artistic expression; social, indicating that the user is Interested in jobs that help or serve other people; enterprising, indicating that the user is interested in jobs that involve leading or influencing other people; and/or conventional, indicating that the user is interested in jobs that involve working with data, information, or files.

| FACTOR: INTEREST/OCCUPATIONAL INTERESTS | |
|---|---|
| Construct | Definition |
| Realistic | interested in jobs that that require use of tools, machines, or physical skills |
| Investigative | Interested in jobs that involve theory, research, and scientific inquiry |

-continued

| FACTOR: INTEREST/OCCUPATIONAL INTERESTS | |
|---|---|
| Construct | Definition |
| Artistic | Interested in jobs that involve creativity, originality, and artistic expression |
| Social | Interested in jobs that help or serve other people |
| Enterprising | Interested in jobs thot involve leading or influencing other people |
| Conventional | Interested in jobs that involve working with data, information, or files |

As non-limiting examples seen in FIG. 5, questions presented within a survey to determine the interests/occupational interests for the user may include questions determining whether or not the user agrees or disagrees that they have interests in: developing a new medicine; creating a computer program; helping other people with personal or emotional problems; giving career guidance to people; and/or working in law enforcement.

As further seen in FIG. 5, the motivation/life aspiration subcategory may include one or more questions used to determine the user's motivations and/or life aspirations. The following table demonstrates the associated motivations/life aspiration factors (e.g., motivated for wealth, motivated to help others, motivated by justice), which may include the following constructs and definitions for the factors associated with the user's motivations/life aspirations: love of knowledge, indicating that the user is motivated to seek out and learn new things; achievement-striving, indicating that the user is motivated to be the best at what they do; aesthetic appreciation, indicating that the user has a deep appreciation for the value of art, music, and literature; status, indicating that the user is motivated by desire for status and recognition; wealth, indicating that the user is motivated by desire for money and material possessions; and/or equity/fairness, indicating that the user is motivated by strong commitment to social justice and fairness.

| FACTOR: ASPIRATIONS/MOTIVATIONS | |
|---|---|
| Construct | Definition |
| Love of Knowledge | Motivated to seek out and learn new things |
| Achievement-Striving | Motivated to be the best at what I do |
| Aesthetic Appreciation | Deep appreciation for the value of art, music, and literature |
| Status | Motivated by desire for status and recognition |
| Wealth | Motivated by desire for money and material possessions |
| Equity/Fairness | Motivated by strong commitment to social justice and fairness |

As non-limiting examples seen in FIG. 5, questions presented within a survey to determine the motivation/life aspirations for the user may include questions determining whether or not the user agrees or disagrees that they: have a strong need for power; are committed to principles of justice and equality; want to surpass others' accomplishments; want to help others; and/or feel it's important to live in a world of beauty.

The Cognitive Match tab in the non-limiting example embodiment shown in FIG. 6 includes subcategories including the personality subcategory, and the learning preferences subcategory.

As seen in FIG. 6, the personality subcategory may include one or more questions used to determine the user's personality. The following table demonstrates the associated personality trait factors (e.g., openness to experience, extraversion, conscientiousness), which may include the following constructs and definitions for the factors associated with the user's personality: openness to experience, indicating that the user tends to be adventurous, variety-seeking, and nontraditional; conscientiousness, indicating that the user tends to be organized and mindful of details; extraversion, indicating that the user is outgoing and tends to gain energy in social situations; agreeableness, indicating that the user tends to be cooperative and exhibit pro-social behaviors; and/or neuroticism, indicating that the user tends to experience mood swings, anxiety, irritability and sadness.

| FACTOR: PERSONALITY | |
|---|---|
| Construct | Definition |
| Openness to Experience | Tend to be adventurous, variety-seeking, and nontraditional |
| Conscientiousness | Tend to be organized and mindful of details |
| Extraversion | Outgoing and tend to gain energy in social situations |
| Agreeableness | Tend to be cooperative and exhibit prosocial behaviors |
| Neuroticism | Tend to experience mood swings, anxiety, irritability and sadness |

As non-limiting examples seen in FIG. 6, questions presented within a survey to determine the personality of the user may include questions determining whether or not the user agrees or disagrees that they: accomplish their work on time; dislike being the center of attention; get stressed out easily; start conversations; and/or are interested in people.

As seen in FIG. 6, the survey may include a subcategory for determining the user's preferences and/or skills in learning and/or thinking. This subcategory may include one or more questions used to determine the user's preferences and/or skills in learning and/or thinking. The following tables outline the factors associated with the user's preferences and/or skills related to learning and/or thinking factors. Specifically, the following table includes constructs and definitions for the factors associated with the user's thinking preferences (e.g., creativity, conservatism, problem-solving), which may include the following: emotion-based decision-making, indicating the user's preference for making decisions based on feelings and emotion; creativity, indicating the user's belief in one's ability to generate new and interesting ideas; teamwork, indicating the user's preference for working with others; conservatism, indicating the user's attitude on punishment, individuality, and authority; intellectual rebel, indicating that the user has a skeptical and critical attitude toward new ideas; and/or problem-solving, indicating that the user enjoys solving and analyzing challenging problems.

| FACTOR: THINKING PREFERENCES | |
|---|---|
| Construct | Definition |
| Emotion-Based Decision-Making | Preference for making decisions based on feelings and emotion |
| Creativity | Belief in one's ability to generate new and interesting ideas |
| Teamwork | Preference for working with others |
| Conservatism | Attitude on punishment, individuality, and authority |

| FACTOR: THINKING PREFERENCES | |
| --- | --- |
| Construct | Definition |
| Intellectual Rebel | Skeptical and critical attitude toward new ideas |
| Problem-Solving | Enjoy solving and analyzing challenging problems |

Similarly, the following table demonstrates learning or thinking skills factors (e.g., collaboration, study-skills, meta-cognition) may include the following constructs and definitions for the factors associated with the user's learning skills: study skills, indicating the user's use of successful studying strategies when learning; collaboration skills, indicating whether the user possesses skills necessary for effective collaborative learning (which may overlap teamwork, discussed above); goal setting, indicating a user's desire to master material and maximize learning rather than simply perform well; and/or meta-cognition, indicating the user's ability to effectively set, monitor, and evaluate learning goals.

| FACTOR: LEARNING SKILLS | |
| --- | --- |
| Construct | Definition |
| Study Skills | Use of successful studying strategies when learning |
| Collaboration Skills | Possess skills necessary for effective collaborative learning, (overlap teamwork) |
| Goal Setting | Desire to master material and maximize learning rather than simply perform well |
| Meta-Cognition | Effective setting, monitoring, and evaluating learning goals |

As non-limiting examples seen in FIG. 6, questions presented within a survey to determine the user's preferences and/or skills in learning and/or thinking may include questions determining whether or not the user agrees or disagrees that they: enjoy studying with peers; like the challenge of problems without clear solutions; need guidance from an instructor to stay on track; are thrilled when they learn something new; and/or test themselves on information they're trying to learn.

The continuation of the Cognitive Match tab in the non-limiting example embodiment shown in FIG. 7 includes subcategories including the mindset subcategory, and the cognitive ability subcategory.

As seen in FIG. 7, the mindset subcategory may include one or more questions used to determine the user's mindset. The following table demonstrates the associated mindset factors (e.g., self-efficacy, perseverance, goal-setting), which may include the following constructs and definitions for the factors associated with the user's mindset: grit, indicating the user's perseverance and passion for long-term goals. (which may overlap with conscientiousness, discussed above); theory of Intelligence, indicating the user's belief that intelligence is fixed and can't be grown; sense of belonging, indicating the user's belief in one's suitability for success in a particular learning context (which may overlap with self-efficacy, discussed below); and/or self-efficacy, indicating the user's belief in one's ability to learn and successfully accomplish goals.

| FACTOR: MINDSET | |
| --- | --- |
| Construct | Definition |
| Grit | Perseverance and passion for long-term goals, (overlap with conscientiousness) |
| Theory of Intelligence | Belief that intelligence is fixed and can't be grown |
| Sense of Belonging | Belief in one's suitability for success in a particular learning context (overlap self-efficacy) |
| Self-Efficacy | Belief in one's ability to learn and successfully accomplish goals |

As non-limiting examples seen in FIG. 7, questions presented within a survey to determine the mindset of the user may include questions determining whether or not the user agrees or disagrees that: setbacks don't discourage them; intelligence isn't something that people can change very much; they can handle complex problems; they have difficulty maintaining focus on long-term projects; and/or they often worry that they're not as smart as their peers.

As seen in FIG. 7, the cognitive ability/aptitude subcategory may include one or more questions or challenges used to determine the user's cognitive ability and/or aptitude. The following table demonstrates the associated cognitive/aptitude factors (e.g., academic ability, verbal/spatial reasoning, achievement), which may include the following constructs and definitions for the factors: academic ability, indicating the user/student's verbal and mathematical ability; general academic achievement, indicating how well the user/student has performed in prior educational settings; subject-relevant achievement, indicating how well the user/student has performed in relevant subjects; verbal reasoning, indicating the user/student's ability to understand and logically work through concepts and problems expressed in words; spatial reasoning, indicating the user/student's capacity to think about objects in three dimensions and to draw conclusions; and/or matrix reasoning, indicating the user/student's visual-spatial problem solving that is often used to determine intelligence.

| FACTOR: APTITUDE/COGNITIVE ABILITY | |
| --- | --- |
| Construct | Definition |
| Academic Ability | Student verbal and mathematical ability |
| General Academic Achievement | How well students have performed in prior educational settings |
| Subject-Relevant Achievement | How well students have performed in relevant subjects |
| Verbal Reasoning | Ability to understand and logically work through concepts and problems expressed in words |
| Spatial Reasoning | Capacity to think about objects in three dimensions and to draw conclusions |
| Matrix Reasoning | Visual-spatial problem solving that is often used to determine intelligence |

As non-limiting examples seen in FIG. 7, questions presented within a survey to determine the cognitive ability/aptitude of the user may include questions or challenges to be solved (e.g., spatial or matrix reasoning challenges, as shown).

Figure 8:
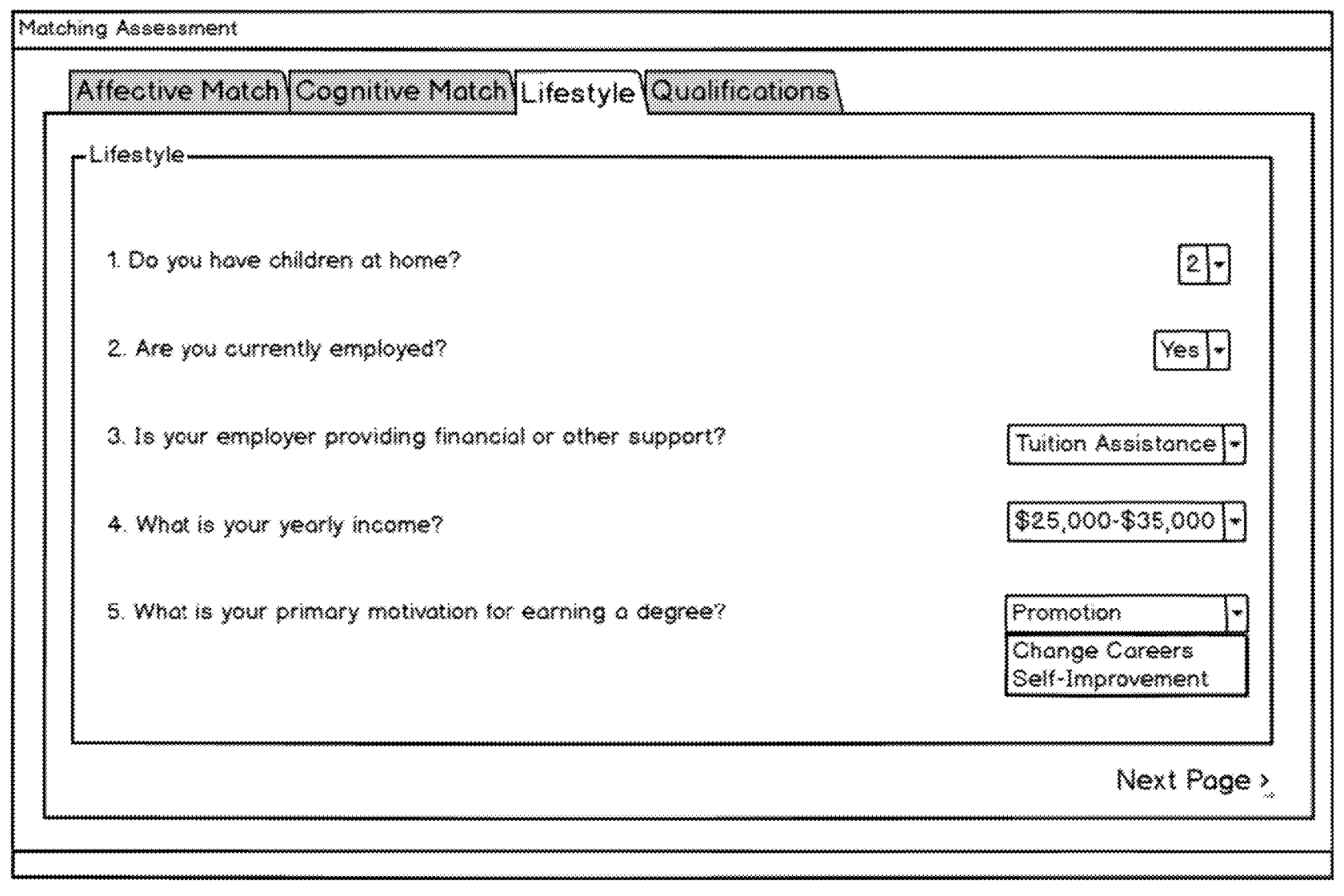

In embodiments such as those seen in FIGS. 8-9, the survey questions may not lend themselves to receiving rating data, and may require the user to select an option, or to respond to more open-ended questions. To accommodate these different data formats, the GUIs for receiving user input for these survey questions may include additional GUI components, such as the dropdown menus or textboxes seen in FIGS. 8-9.

The Lifestyle tab in the non-limiting example embodiment shown in FIG. 8 includes a lifestyle subcategory, which may include one or more questions used to determine the user's lifestyle. The following table demonstrates the associated lifestyle factors (e.g., family, income, culture), which may include the following constructs and definitions for the factors: family, indicating whether the user has a family or not; income, indicating the annual household income for the user; employment, indicating the current and prior industry experience for the user; cultural experience, indicating whether or not the degree or degree program to be considered for the user is an environmental fit (family, friends, etc.); work/life balance, indicating a spectrum of the user's work to free time; leisure activities, indicating a user's use of free time; ethnicity, indicating the user's ethnicity; and/or gender, indicating the user's gender.

| FACTOR: LIFESTYLE | |
| --- | --- |
| Construct | Definition |
| Family | Has a family or not |
| Income | Annual household income |
| Employment | Current and prior industry experience |
| Cultural Experience | Environmental fit (family, friends, etc.) |
| Work/Life Balance | Spectrum of work to free time |
| Leisure Activities | Use of free time |
| Ethnicity | Ethnicity |
| Gender | Gender |

As non-limiting examples seen in FIG. 8, questions presented within a survey to determine the lifestyle of the user may include questions determining: whether the user has any children at home; whether the user is currently employed; whether or not the user's employer provides financial or other support; the user's yearly income; and the user's primary motivation for earning a degree.

The Qualifications tab in the non-limiting example embodiment shown in FIG. 9 includes subcategories including the educational/degree information subcategory, and the professional experience subcategory.

As seen in FIG. 9, the educational/degree information subcategory may include one or more questions used to determine the user's qualifications according to their educational background and/or degrees earned. The following table demonstrates the associated educational information/ degree factors (e.g., degrees earned, GPA, graduate level tests), which may include the following constructs and definitions for the factors: degree(s), indicating the degree(s) earned by the user; and/or satisfaction, indicating the level of satisfaction with degree earned.

| FACTOR: DEGREE INFO | |
| --- | --- |
| Construct | Definition |
| Degree(s) | Degree(s) earned |
| Satisfaction | Satisfaction with degree earned |

As non-limiting examples seen in FIG. 9, questions presented within a survey to determine the educational/ degree information of the user may include questions determining: the highest degree earned by the user; the degree earned by the user; the user's college GPA; the user's high school GPA; whether or not the user has taken any graduate level tests (e.g., GRE, LSAT); and the graduate level tests taken by the user.

As seen in FIG. 9, the professional experience information subcategory may include one or more questions used to determine the user's qualifications according to their professional experience.

As non-limiting examples seen in FIG. 9, questions presented within a survey to determine the professional experience information of the user may include questions determining: whether or not the user has any licenses or certificates; and/or the user's years of full-time professional work experience.

Although not shown in FIGS. 5-9, for users who have completed or are currently completing a degree, the survey may further include a GUI, or a degree selection or input GUI component on the existing GUIs, allowing the user to specify the degree they received or are currently working towards.

The survey for previous or current students may further include a GUI or GUI component (not shown), for indicating a user's level of success and/or satisfaction in association with the indicated degree. As a non-limiting example, this level of satisfaction may be indicated using a rating GUI component similar to those shown in FIGS. 5-9 to indicate a level of success and/or satisfaction as a result of completing the identified degree. When the survey is complete, the user may submit all data from the survey, which may then be transmitted through the network 120 to server 102.

In some embodiments, not shown in FIGS. 5-9, the algorithm may aggregate additional data Thus, in addition to the survey data disclosed herein, the additional data may also be used to identify a user's degree, identify the various degree factors associated with that degree, and determine the level of users' success and/or satisfaction with the degree.

As a non-limiting example, the disclosed system may use sentiment analysis on the user's social media platforms, such as LinkedIn, proprietary university social media platforms, shared data relating to a student's extracurricular activities/clubs, etc. to determine a student's level of success and/or satisfaction with their current or former program. Academic records, such as reports from educational software, school transcripts, GPA, etc. may also be used to aggregate data about the user.

The user input from each survey may be transmitted from client 106 through the network 120 to server(s) 112. In response, the disclosed system, possibly server(s) 112, may receive the input survey data, and identify, within the survey data, the degree identifier received by the user, a rating value indicating the level of success or satisfaction the user has associated with the degree identifier, and a response to the survey questions, each indicating a rating value selected by the user and indicating a level to which the user agrees or disagrees that the associated factor applies to the user. Server 102 may then store, in data store 110, a user identifier, a degree identifier, a level of success and satisfaction, and a response/rating for each survey question.

In some embodiments, not shown in FIGS. 5-9, the algorithm may aggregate additional data for use in the disclosed algorithms. This additional data may include data retrieved after accessing and/or crawling one or more data sources, and identifying, within the accessed or crawled data sources, the data needed to generate the disclosed model and run the disclosed algorithm to determine the optimal degree and/or degree program for the user.

One non-limiting example of this type of data source may include one or more publicly-available social media sites (e.g. LinkedIn, Facebook, Twitter, etc.) associated with the user, or available to the disclosed system after receiving permissions from the user. In this example, server 102 may crawl each of the social media websites, and identify keywords (e.g., the user's degree, various degree factor keywords, "successful," "satisfied," etc.), for use in sentiment analysis, thereby indicating the user's degree, the user's satisfaction with their degree and/or degree program, and various degree factors that have affected the user's success and satisfaction with the degree or degree program.

Another non-limiting example of this type of data source may include one or more publicly-available academic records for the user, or available to the disclosed system after receiving permissions from the user. In this example, server 102 may crawl the available academic records and identify the user's degree. Server 102 may then user context clues to determine the level of success of the user, such as the user's grade point average, or the level of complexity for classes found on the user's academic transcript, etc.

Combinations of these two types of data source may also be used. As a non-limiting example, the user's social media or academic records may indicate organizations or clubs related to the degree or degree program that the user belonged to, excelled at, and expressed satisfaction with. This data may also be included in determining the user's success or satisfaction with their received degree.

Another non-limiting example of this type of data source may include one or more products or services available to the user, which may or may not be related to the survey software disclosed herein. This data may include publicly-available results for assessments or recommendations available from the related products or services, or available to the disclosed system after receiving permissions from the user. In this example, server 102 may crawl the available results, or possibly access a database of results and recommendations, and parse this information to determine the user's degree or degree program, level of success and satisfaction with the degree, and the degree factors associated with the user. in some embodiments, these degree factors may have already been identified by the related products or services.

Thus, in addition to the survey data disclosed herein, the additional data may also be used to identify a user's degree, identify the various degree factors associated with that degree, and determine the level of users' success and/or satisfaction with the degree.

As a non-limiting example, the disclosed system may use sentiment analysis on the user's social media platforms, such as LinkedIn, proprietary university social media platforms, shared data relating to a student's extracurricular activities/clubs, etc. to determine a student's level of success and/or satisfaction with their current or former program. Academic records, such as reports from educational software, school transcripts, GPA, etc. may also be used to aggregate data about the user.

Server 102 may then analyze the results of the received survey data (or other data, where applicable), and use the received data, specifically the degree identifier, rating of satisfaction, and factors identified for the former or current student that input the responses to the survey questions, to construct a predictive model that predicts a likelihood of success and satisfaction of future users with matching factors. The system may use this predicted likelihood of success and satisfaction to recommend degrees and/or degree programs to future users. In some embodiments, server 102 may generate a different model for each degree identifier within data store 110.

As a first step in creating this model, server 102 may identify the degree identifier selected by the user, and the rating value assigned to the level of success and satisfaction associated with the selected degree (or associated degree program). As a non-limiting example, a user may have selected Masters in Social Work as their degree identifier, and may have further selected a rating of 5, indicating that they believe that this degree has allowed them to achieve a high level of success and satisfaction in their career path.

In some embodiments, the rating value associated with the success and satisfaction for the degree identifier may be determined using the additional data referred to above. As non-limiting examples a social media profile may disclose a user's degree identifier, and a sentiment analysis of this social media profile may indicate attrition from, or a lack of success resulting from the degree identifier. Similar analysis may reveal a level of success or satisfaction associated with the degree identifier.

After identifying the user's degree identifier and rating value indicating a level of satisfaction, server 102 may analyze the user responses to the survey questions, and by extension each of the associated factor rating values received in the user response. As a preliminary step, server 102 may select, from data store and as input by the system administrators as described above, the degree factor associated with each survey question. Server 102 may then associate each identified factor with each factor rating score provided in the response for that survey question.

If the user indicated a high level of success and satisfaction with the selected degree identifier, and a high factor rating score (e.g., 4-5, indicating the user agrees or strongly agrees that the degree factor applies to them) for a degree factor associated with a survey question, server 102 may update the model, mapping the degree factor to the degree identifier, or in other words, indicating that the degree factor indicates a high likelihood of success and satisfaction for the degree.

As a non-limiting example (analogous to FIG. 5), the user may have selected Masters of Social Work as their degree, and indicated a level of success/satisfaction as 5, the highest possible rating. The user also may have indicated, as in FIG. 5, that they strongly agree that their interests include helping people with personal or emotional problems, and giving career guidance to people. As the disclosed system analyzes this data, it may determine that there is a high likelihood that future students who agree that their interests include helping people with personal or emotional problems, and giving career guidance to people, will find success and satisfaction by pursuing a masters degree in social work.

Similarly, if the user indicated a high level of success and satisfaction with their degree and a low factor rating score for the factor associated with the survey question, server 102 may update the model, indicating that the factor does not indicate a high likelihood of success for the degree.

As seen in FIGS. 7-9, not all survey questions may be responded to using ratings. Server 102 may therefore be configured to generate GUI components within the GUI that receive responses to more open-ended survey questions. As non-limiting examples, these GUI components may include means to demonstrate cognitive ability, dropdown menus, textboxes, text areas, etc., as demonstrated in FIGS. 7-9. Server 102 may receive the input from these additional GUI components, and store the data in association with the other user profile data in data store 110.

The survey may be conducted and repeated for multiple users, thereby generating an assessment and aggregation of multiple (possibly a large number of) survey results. These survey results may include a variety of data and outcomes, including different selected degree identifiers, different success/satisfaction rating values associated with the selected degree identifier or degree programs, and responses to survey questions indicating different factor rating values or other input for each of the degree factors.

For example, a first user in the example above may have selected Masters of Social Work as their degree identifier, a rating of 5, indicating a high level of success with this degree, and a first set of factor rating values. A second user may also have selected Masters of Social Work as their degree identifier, a rating of 4, indicating a satisfactory level of success for this degree, and a second set of factor rating values. A third user may also have selected Masters of Social Work as their degree identifier, a rating of 1, indicating a low level of success for this degree, and a third set of factor rating values. A fourth user may have selected a different degree identifier, a different success/satisfaction rating, a different set of factor rating values, and so on, with varying degree identifiers, ratings, and other results.

In response to receiving the user input for each new survey, server 102 may update the generated model to reflect an aggregation of all received data. For example, in response to receiving user input data for a new survey, server 102, may identify the degree identifier in the survey, and determine whether the success/satisfaction rating for the degree is greater than a threshold (e.g., 4-5, possibly according to the threshold defined by the system administrators as described above). Then, for each highly rated factor rating associated with the high success/satisfaction result for the degree identifier (e.g., 4-5, possibly exceeding the threshold) server 102 may execute a database query to determine a percentage of surveys in which the analyzed factor rating was also highly rated and/or rated above the threshold.

In some embodiments, if the percentage of that factor exceeds a threshold (e.g., 80%, again, possibly defined by a system administrator), the analyzed factor may be mapped to the degree, indicating that the factor has predictive value in predicting success and satisfaction for that degree. This process may be repeated for each factor rating in new and/or aggregated survey response data, mapping highly rated responses to the degree, indicating a high likelihood of success for the degree identifier for users who demonstrate that factor. In some embodiments, server 102 may generate a data record associating the degree identifier with a degree factor identifier.

Continuing the example above, as a non-limiting example, multiple users may have selected Masters of Social Work as their degree. For those users who indicated a high level or success or satisfaction with the degree (e.g., 4 or 5), each factor (e.g., interests that include helping people with personal or emotional problems, and giving career guidance to people) may be analyzed to determine whether a percentage of users above the threshold (e.g., 80%) have rated that factor with a high rating (e.g., 4 or 5). For those high-rated factors that exceed the threshold, the system may map the identifier for that factor to the degree identifier, and store the mapping in data store 110.

In addition to finding common response ratings, server 102 may analyze the non-rated survey responses received by the user, and compare them with the non-rated survey responses stored in data store 110 and associated with a degree identifier further associated with a highly rated success and satisfaction level. If a total number of non-rated survey responses containing a matching response are above a predetermined threshold (e.g., 80%), the system may map the factor associated with the survey response to the degree identifier, and store the mapping in data store 110, similar to that described above.

Server 102 may analyze the mappings between the factors and the likelihood of success for the degree identifier, and in some embodiments, assign a weight, based on an analysis of the strength of the mapping between the factors and the likelihood of success. As non-limiting examples: a factor with 90% high ratings would be weighted greater than a factor with 80% high ratings; a factor that averages a rating of 4 would be weighted higher than a factor with an average rating of 3 in predicting success and satisfaction for a particular degree; a factor with a greater number of responses would be weighted higher than a factor with fewer responses in predicting success and satisfaction for a particular degree; and so forth.

Thus, a heuristic algorithm may use the model to determine, from a machine learning point of view, the factors that determined the result, whether the student enjoyed and was successful and satisfied with the program, or was unhappy, causing attrition or otherwise dropping out from the program. The algorithm may identify the factors that contributed to the satisfaction or dissatisfaction of the program, and store the determination in the database in association with the factors and the degree identifier.

As noted above, the disclosed system, software, algorithms, etc. include two functionalities: a prediction function and a filtering function, both described in greater detail below. The prediction function may use student-provided information to predict, with some measurable degree of certainty, which degree is most likely to be the best recommendation for the student, according to the model described above. The prediction function may further include a filtering system that funnels students to the most successful degrees and/or programs based on an aggregation of data collected about the student, and the students' selections.

Thus, once the model and/or machine learning algorithm described above are trained, the disclosed system may aggregate and collect data, including information about a current user such as a prospective student trying to decide on a degree or degree program. In addition to the survey questions set forth above, this determination may also be made using any information about the user accessible to a prospective user's profile.

As non-limiting examples, such information may be aggregated from, as non-limiting examples: survey responses on a website/app; academic performance in an educational product; a student's sharing of extracurricular activities/clubs on a social platform; performance data aggregated from school transcripts, possibly including a school GPA; performance data from educational course courseware, etc.

The embodiments shown in FIGS. 4-9 demonstrate a software or application for providing a prospective student with a survey including the survey questions described above, and receiving user input in response to the survey questions.

FIG. 3, in conjunction with FIGS. 4-15, demonstrate a non-limiting example of a flowchart and a series of wireframes/screenshots illustrating an example of a possible student workflow for a software tool that provides the survey questions and collects data from the user, such as a prospective student.

Turning now to step 300 of FIG. 3, the student may enter the survey, possibly by accessing an associated software, web page, etc. As a non-limiting example, FIG. 4 demonstrates an entry screen for the user taking the survey, such as the example prospective student referred to above. This entry screen may include instructions to the student, such as "Let us find the best program match for you" and "Create profile."

In step 305, the user may proceed through the survey, inputting a response reflecting a factor rating for those survey questions that accept factor ratings, thereby indicating whether the user agrees or disagrees that the factor represents the user, or inputting responses for those that do not. Upon completing the survey, the user may input into client 106 a submit command, which may transmit the survey data input by the user through network 120 to server 102.

In step 310, server 102 may receive the transmitted survey data, and input the received data as relevant predictive data into the disclosed algorithm and/or generated predictive model 315 described in detail above.

The predictive model 316 may analyze the input survey data, and identify the highly rated degree factors, using method steps similar to those set forth above. Using the identified highly rated degree factors from the survey response data, server 102 may execute a database query selecting the data associated with one or more degree identifiers that share at least one highly rated degree factor with the highly rated degree factors from the survey data.

Using the dataset returned from the database query identifying the degree identifiers sharing at least one highly rated degree factor with the survey data, the disclosed algorithm, possibly the predictive model 315, may generate a list of candidate degree identifiers that share the common highly rated degree factor with the survey data.

For each of the candidate degree identifiers in the generated list, server 102 may generate a degree success score, which may use mathematical relationships, weights, correlations, and other scores to create a degree success score for each degree identifier, reflecting a matching highly-rated factor shared between the survey data and the factors associated with the degree identifier. As a non-limiting example, the degree score may be a percentage of highly rated degree factors associated with the degree identifier, which are also highly rated degree factors in the survey data.

Returning to FIG. 3, the algorithm and/or predictive model 315 may then receive the degree success score for each of the identified degrees, and order the list of candidate degree identifiers, possibly from highest degree success score to lowest degree success score. Thus, in step 320, in some embodiments, the predictive model output may include the ranked and ordered list of candidate degree identifiers having high scoring factors that match the current users identified and highly ranked factors. Thus, in step 325, the disclosed system may rank the degrees by degree success score, possibly according to matching factors, indicating the user's highest likelihood of success and/or the likelihood that the current user will succeed and be satisfied with each identified degree.

Figure 10:
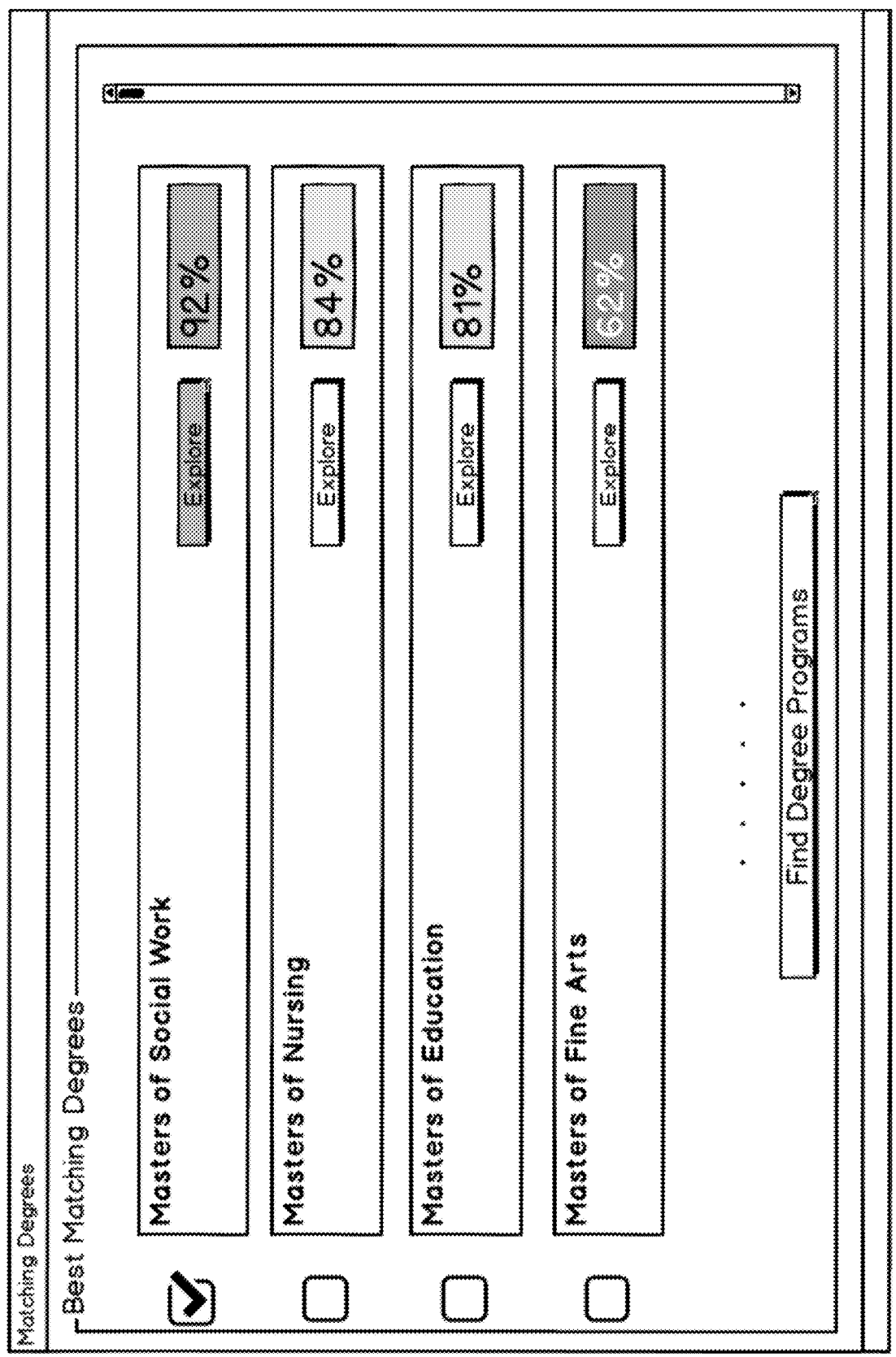
FIG. 10 illustrates a non-limiting example user interface for displaying a list of selectable degrees.

As seen in FIG. 10, server 102 may generate, possibly from the output in step 320, a GUI to display the generated list of candidate degree identifiers and their associated degree success scores, which reflect the percentage of common highly rated degree factors, and which are used to order the list according to highest degree success scores. As seen in FIG. 10, the GUI may further include means for accessing details about each of the degree identifiers, as evidenced by the checkboxes and "Explore" buttons. This GUI may be transmitted through network 120 to client 106.

Thus, returning to FIG. 3, in step 330, the user may browse degrees and explore the strengths and weaknesses of each degree relative to all different listed degrees.

In some embodiments, not seen in FIGS. 10-15, server 102 may be configured to generate, and transmit through the network for display, one or more GUIs including one or more reports providing the user with details used in generating the results of the survey. As non-limiting examples, a report displayed within the GUI may include a breakdown of how each of the degree factors was used to determine the degrees included in the list, their associated scores, how the degree factors associated with the user were matched to the degree factors associated with previous students in that degree program, etc.

In the non-limiting example embodiment seen in FIG. 11, the user may select individual links or buttons associated with specific degrees in order to explore additional details about the degree. The link or button may be generated in conjunction with the URL or network location, etc. input in association with the degree details by the system administrator, as set forth above. In response to the user selecting this link or button, the client 106 may send a request through network 120, causing server 102 to generate a GUI, comprising GUI content, for displaying the details for the selected degree, and transmit the GUI to client device 106 for display.

In the non-limiting example seen in FIG. 11, the user has selected the Masters of Social Work degree program displayed in FIG. 10, and selected the "Explore" button or link. Server 102 has generated the GUI content seen in FIG. 11, and transmitted it to client 106 for display.

As seen in FIG. 11, the content for the degree details may include any content, including degree information input by the system administrator as described above. In the non-limiting example seen in FIG. 11, the GUI may include subcategories that provide details for the degree success score and degree info. In this example, the degree success score subcategories includes the score itself, and graphical representations and additional text outlining the match to the user's responses for aspirations and interests. Other embodiments may include any combination of graphical representations and additional text outlining any of the factors used to determine the degree success score.

In the degree info subcategory, this example further includes details for the degree, including common occupations associated with the degree, the degree's median salary, and the time required to complete the degree.

As seen in FIG. 11, after reviewing the details for the degree and the associated degree success score, the user may select a link or button to return to the list of program results.

In step 335, the user may select one or more of the listed degrees. To accomplish this, as seen in FIG. 10, the GUI may include one or more GUI controls, such as one or more checkboxes, as a means of selecting one or more of the degrees. As a non-limiting example seen in FIG. 10, the user may select, using a checkbox, matching degrees including: Masters in Social Work, Masters in Nursing, Masters of Education, and/or Masters of Fine Arts, which were output and ranked by the predictive algorithm/model 315 as the degrees representing the highest likelihood that the user would succeed and find satisfaction in a degree program including the listed degrees according to matching identified user factors.

The GUI may further include a degree success score associated with each degree, which reflects the magnitude of the match as described above. The non-limiting example embodiment seen in FIG. 10 further includes links or buttons for finding degree programs, as well as individual links or buttons used to explore additional details regarding degree programs associated with the listed degree, described above.

As seen in FIG. 12, in some embodiments, the generated GUI may include an additional panel for filtering the list of degree identifier results. The filters used in altering the list of degree identifier results may reflect the limitations that the user wants to incorporate into the generation of the degree identifier list. In some embodiments, the filters available to the user may be according to the degree filters defined and stored by a system administrator, as described above.

Thus, in the non-limiting example seen in FIG. 12, the GUI previously presented in FIG. 10 may be updated (or a new GUI generated) to include a panel to "Filter Matching Degrees." In this non-limiting examples embodiment, the user may filter the generated list of matching degrees according to academic discipline, median salary, degree level, time-to-degree, and/or according to a search for a specific degree.

In step 335, the student selects one or more of the degrees in order to be presented with, and select, one or more degree programs. These degree programs, and the degree program information presented to the user as GUI content in the following examples, may include the degree programs and degree program information input into the system by a system administrator, as described above.

As seen in FIG. 10, the GUI may include one or more GUI controls, such as one or more checkboxes, as a means of selecting one or more of the degrees. As a non-limiting example seen in FIG. 10, the user may select, using a checkbox, matching degrees including: Masters in Social Work, Masters in Nursing, Masters of Education, and/or Masters of Fine Arts, which were output and ranked by the predictive algorithm/model 315. The GUI may further include links or buttons for finding degree programs, as well as individual links or buttons used to explore additional details regarding degree programs associated with the listed degree.

For each of the selectable degrees in the list of degrees matching the user's identified factors, client 106 may receive a request to view one or more degree programs associated with each of the degrees in the list. In response to this request, server 102 may execute a database query, selecting from data store 110 all degree programs associated with each selected degree, possibly the degree programs and details input by a system administrator, as described above. As a result, as the degree is selected and the request input, server 102 may generate a list of degree programs associated in data store 110 with the selected degree, such as the list seen in FIG. 14.

Figure 13:
FIG. 13 illustrates a non-limiting example user interface for optimizing a list of degree program recommendations.

Returning to FIG. 3, in step 340, the disclosed system may apply one or more program-specific filtering questions to help the user identify an ideal degree program for the degree selected in step 335 (shown as a non-limiting example in FIGS. 12-14). In some embodiments, these degree filtering questions may include the degree filtering questions input by the system administrators, as described above. Server 102 may identify and select all degree programs associated with the selected degree identifiers.

The disclosed system may therefore be configured to include a filtering option where, given the degree program recommendations (or the degree recommendations, disclosed above) the user may fine tune the recommendations based on the user's unique circumstances. These unique circumstances may include tangential or logistical considerations, other than those which would be informative to the degree matching algorithm above, that allow the user to filter those ranked recommendations according to student volition.

FIGS. 12-14 demonstrate the filtering function of the disclosed system, which uses user-provided information to filter the results of the degrees or degree programs for a selected degree based on their qualifications and logistics of their programs, lifestyle, and/or stage in life to filter out or eliminate degree programs that would be a poor fit for the student.

In some embodiments, the options for filtering and narrowing the generated list of matching degree programs may be based on degree program specific questions. As non-limiting examples, the GUI components for these embodiments may ask program specific questions and provide the user with options to select tuition expenses, prestige of the school and program, cost benefits of the programs, etc. In this example, the user may therefore select filters by selecting GUI components configured to filter according to the user's selected program specific questions. The system, possibly server 102, may then filter the results, according to the selected GUI components, and generate a list of degree programs according to the filters (e.g., tuition expenses).

In some embodiments, the options for filtering and narrowing the generated list of matching degree programs may be based on lifestyle specific questions. As non-limiting examples, the GUI components for these embodiments may ask lifestyle specific questions and provide the user with options to select geographically close degree programs, etc. In this example, the user may therefore select filters by selecting GUI components configured to filter according to the user's selected lifestyle specific questions. The system, possibly server 102, may then filter the results, according to the selected GUI components, and generate a list of degree programs according to the filters (e.g., geographically close degree programs).

In embodiments such as that seen in FIG. 13, the user may further optimize the list of generated degree program recommendations. As seen in FIG. 13, these optimizations may be based on user input. In this example, the user has selected the Masters of Social Work program shown in FIG. 10, and possibly has filtered the matching degrees and degree programs according to the degree and degree program filters selected by the user.

FIG. 13 represents questions that may be presented to the user to further optimize the program recommendations. For example, in FIG. 13, the system may generate a GUI including multiple questions, and the user may provide responses to those questions. Based on the user's responses, the disclosed system may then optimize the list of recommended degree programs according to the user input, removing those degree programs from the recommended degree program list that do not include the criteria input by the user. Thus, in the examples in FIGS. 13 and 14, the user may be provided a revised list including the degree programs that value mental health work experience, that provide the user with any accessibility needs, and value volunteer experience within the last 6 months.

Returning to FIG. 3, after selecting the filters in step 340, the user may be presented with matching programs in step 345. FIG. 14 demonstrates both an example of a degree program result list, and an additional example of filtering that may be used to filter the degree program result list. In this example, the user may select a desired cost associated with degree programs for the selected degree, whether or not the degree program includes available certificates, and how many miles away the program is.

As a non-limiting example, after selecting the various filters from the GUI, the user may submit the request for a revised list of degree programs. In some embodiments, this request may be sent to the server 102, which may revise the generated list of degree programs, selecting only those degree programs matching the filtering criteria selected by the user. In this example, server 102 may generate a new degree program list according to the new criteria, and generate a GUI including the revised list. Server 102 may then transmit the GUI with the revised list to the user's client device for display, possibly in a format similar to that seen in FIG. 14.

Returning to FIG. 3, in step 350, the student may use this generated list to explore programs based on the user's filtered preferences. In some embodiments, the user may explore the programs using selections of an "Explore" link or button, and receive a GUI providing additional details for the programs, similar to the steps described in association with FIGS. 10 and 11 above. In embodiments such as that seen in FIG. 14, users may select degree programs by clicking on programs within the list, which may also generate a display including the details of the degree programs selected by the user.

After researching, as shown in step 355 of FIG. 3, the user/student may apply to their ideal program, as shown in FIG. 14. In embodiments such as that seen in FIG. 15, the user may select a link or button (possibly input into the system by a system administrator, as described above), directing the user to access informational or registration materials for the one or more recommended degree programs.

Additional embodiments may also be envisioned. For example, in some embodiments, the disclosed system may be a stand-alone offering, where students are able to navigate to a specific website to use a tool including the disclosed embodiments. In these embodiments, the providing entity may have an opportunity to collect a small fee from the user or potentially earn income from programs that would like to advertise/prioritize their related offerings.

In some embodiments, the disclosed system may be embedded or otherwise integrated into related products or services to increase their value and usefulness, which would further provide the opportunity to collect student-relevant predictive data in a passive way (e.g., activities/clubs the students uploads to the platform)

In some embodiments, the disclosed system may be used to support other businesses, including generating leads or directing students toward programs for online program management and online learning services organizations, and could further be used to create a sort of online network that attracts and generate a set of quality leads, which could be funneled to partners.

The disclosed embodiments may be further expanded by considering scenarios in which a student would find satisfaction or success in a specific degree or degree program, but lacks specific skills sets that qualify them for such a degree or degree program. If the user lacks these particular skills sets, the disclosed system would not identify this degree or degree program as on which would bring success and satisfaction of the user, because the user lacks the requisite skills to succeed.

However, if intervention resources were available to the user, in these scenarios, that would provide the user with the necessary skill sets that they are lacking, the user may actually be more interested in, and consequently more likely to be successful and find satisfaction in a degree or degree program that includes these skill sets, thereby affecting their academic and career trajectory.

Additional embodiments of the disclosed system may therefore include a recommendation engine, providing additional functionality, in which the disclosed system is able to predict the user's success and satisfaction in degree programs where they are currently lacking specific skill sets, and recommend these degrees and/or degree programs to the user, along with recommended remedial or intervention measures (e.g., software designed to improve the user's skill sets) allowing a user to improve those skill sets, providing a broader range of available and recommended degrees or degree programs to the user.

In these embodiments, server 102 may generate one or more self-exploratory GUIs (not seen in FIGS. 5-10), allowing users to identify additional degrees or degree programs that may be available to them, if certain skill sets are improved. The self-exploratory GUI may therefore further include content reflecting an analysis of the student's strengths and weaknesses along a spectrum of skills, as well as the factors used to determine these strengths and weaknesses. Thus, in addition to identifying the degrees and degree programs that are a best fit for the user, the self-exploratory GUI may further identify each area in which the user may be able to improve.

The self-exploratory GUI may therefore further include the recommended available interventions that may be used to remediate the user's areas of weakness.

This embodiments may be applied to a non-limiting example scenario in which a user is able to take the survey multiple times throughout their academic career (e.g., before beginning, during freshmen year, during sophomore year, etc.). After completing each survey, the self-exploratory GUI may display the recommended degrees, the user's relative strengths and weaknesses, and remedial intervention measures that may be taken, and which may lead to additional recommended degrees if these skills are improved.

In this scenario, the results of the survey may reflect changes to the rating scores for the factors, and if the user's skills sets show improvements (e.g., improvements in analytical thinking, problem solving, and/or soft skills), the recommendations and the remedial intervention suggestions may be updated accordingly (e.g., the rank order of the recommendations may change accordingly, additional recommendations and remedial intervention suggestions may be displayed, etc.).

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A system comprising:
  a database, storing:
    a plurality of degree factors;
    a plurality of survey questions, each associated with a degree factor in the plurality of degree factors; and
    a factor rating threshold; and a server, comprising a computing device coupled to a network and including at least one processor executing instructions within memory which, when executed, cause the system to:
  generate a first Graphical User Interface (GUI) comprising:
    a degree selection GUI component;
    the plurality of survey questions; and
    a factor rating GUI component for each of the plurality of survey questions receiving, as input, a factor rating indicating a level to which the degree factor applies to a user;
  transmit the first GUI to a first client device;
  receive, from the first client device, a first response comprising a degree identifier and the factor rating for each of the plurality of survey questions, wherein the first response is associated with a first user;
  identify, within the first response, at least one high factor rating comprising the factor rating exceeding the factor rating threshold;
  store the at least one high factor rating and the degree identifier in association in the database;
  generate a second GUI comprising the plurality of survey questions and the factor rating GUI component for each of the plurality of survey questions;
  transmit the second GUI to a second client device;
  receive, from the second client device, a second response comprising the factor rating for each of the plurality of survey questions, wherein the second response is associated with a second user;
  identify, within the second response, the at least one high factor rating;
  execute a database command selecting, from the database, at least one degree identifier, wherein the at least one degree identifier includes the degree identifier and the at least one high factor rating common to both the first response and the second response;
  generate a candidate degree list comprising the at least one degree identifier;
  generate a third GUI comprising the candidate degree list; and
  transmit the third GUI to the second client device.

2. The system of claim 1, wherein:
the database further comprises a degree success threshold;
the first GUI further comprises a degree success GUI component receiving, as input, a degree success rating indicating a level of success achieved by the first user resulting from a completed degree;
the instructions further cause the system to identify, within the first response, the at least one high factor rating responsive to the degree success rating exceeding the degree success threshold.

3. The system of claim 1, further comprising:
a plurality of degree content stored within the database; and
a fourth GUI displaying the degree content on the second client device responsive to:
  a request to display the degree content; and
  a selection of the at least one degree identifier from the degree candidate list.

4. The system of claim 1, wherein:
the database further comprises at least one degree filter factor associated with at least one degree in the candidate degree list;
a degree filter GUI component on the third GUI, or a fourth GUI, further comprises at least one degree filter GUI component receiving, as input, a selection of the at least one degree filter factor;
the instructions further cause the system to:
  execute a database command selecting, from the database, the at least one degree identifier, wherein the at least one degree identifier is associated in the database with the at least one degree filter factor;
  re-generate the degree candidate list; and
  display the re-generated degree candidate list on the third GUI.

5. The system of claim 1, wherein:
the database further stores:
  a plurality of degree program identifiers; and
  a degree program content stored in association with each of the plurality of degree program identifiers; and
the instructions further cause the server to:
  receive, from the third GUI:
    a request to display the plurality of degree program identifiers and the degree program content on a fourth GUI; and
    a selection of a degree identifier;
  generate the fourth GUI displaying the degree program identifiers and the degree program content; and
  transmit the fourth GUI to the second client device for display.

6. The system of claim 5, wherein:
the database further comprises at least one degree program filter factor associated with at least one degree program identifier in the plurality of degree program identifiers;
a degree program filter GUI component on the fourth GUI further comprises: at least one degree program filter GUI component receiving, as input, a selection of the at least one degree program filter factor;
the instructions further cause the system to:
  execute a database command selecting, from the database, the at least one degree program identifier, wherein the at least one degree program identifier is associated in the database with the at least one degree program filter factor;
  re-generate the degree program identifier and the degree program content; and
  display the re-generated degree program identifier and the degree program content on the fourth GUI.

7. A method comprising:
generating, by a server, comprising a computing device coupled to a network and including at least one processor executing instructions within memory, a first Graphical User Interface (GUI) comprising:
  a plurality of survey questions, each associated with a degree factor in a plurality of degree factors stored in a database; and
  a factor rating GUI component for each of the plurality of survey questions, the factor rating indicating a level to which the degree factor applies to a user;
transmitting, by the server, the first GUI to a first client device;
receiving, by the server from the first client device, a first response comprising the factor rating for each of the plurality of survey questions, wherein the first response is associated with a first user;
identifying, by the server within the first response, at least one high factor rating comprising the factor rating exceeding a factor rating threshold stored in the database;

executing, by the server, a database command selecting, from the database, at least one degree identifier sharing at least one common high factor rating between the first response and at least one response stored in the database, wherein the at least one response is associated with a second user;

generating, by the server, a candidate degree list comprising the at least one degree identifier;

generating, by the server, a second GUI comprising the candidate degree list; and transmitting, by the server, the second GUI to the first client device.

8. The method of claim 7, further comprising the steps of:
generating, by the server a third GUI comprising:
a degree selection GUI component;
the plurality of survey questions; and
the factor rating GUI component for each of the plurality of survey question and receiving, as input, the at least one response comprising a factor rating indicating a level to which the degree factor applies to a user;
transmit the third GUI to a second client device;
receive, from the second client device, the at least one response comprising a degree identifier, and the factor rating for each of the plurality of survey questions;
identify, within the at least one response, at least one high factor rating; and
store the at least one high factor rating and the degree identifier in association in the database.

9. The method of claim 7, further comprising the steps of:
storing, by the server in the database, a degree success threshold;
generating, by the server on the third GUI, a degree success GUI component receiving, as input, a degree success rating indicating a level of success achieved, resulting from a completed degree;
identifying, by the server within the at least one response, the at least one high factor rating responsive to the degree success rating exceeding the degree success threshold.

10. The method of claim 7, further comprising the steps of:
storing, by the server in the database, that at least one response;
for the at least one degree identifier in the candidate degree list, calculating, by the server, a degree success score comprising a percentage of degree factors associated with high factor ratings in the at least one response, which are also degree factors in the first response associated with high factor ratings; and
displaying, by the server on the second GUI, the degree success score for each degree identifier in the candidate degree list.

11. The method of claim 7, further comprising the steps of:
storing, by the server in the database:
a plurality of user data resulting from a crawl of:
a social media account associated with the user;
an academic record for the user; or
a product or service associated with the survey; and
a plurality of degree content;
identifying, by the server, at least one alternative degree identifier associated with a weakness identified from an analysis of the first response;
generating, by the server:
a third GUI displaying the degree content on the first client device responsive to:
a request to display the degree content; and
a selection of a degree identifier from the degree candidate list; and
a fourth GUI displaying:
an identification of the weakness; and
at least one remediation intervention recommendation wherein, if the weakness is improved, the alternative degree identifier is recommended to the user.

12. The method of claim 7, further comprising the steps of:
storing, by the server within the database, at least one degree filter factor associated with the at least one degree in the candidate degree list;
generating, by the server, a degree filter GUI component on the second GUI, or a third GUI comprising at least one degree filter GUI component receiving, as input, a selection of the at least one degree filter factor;
executing, by the server, a database command selecting, from the database, the at least one degree identifier, wherein the at least one degree identifier is associated in the database with the at least one degree filter factor;
re-generating, by the server, the degree candidate list; and
displaying, by the server, the re-generated degree candidate list on the second GUI.

13. The method of claim 7, further comprising the steps of:
storing, by the server within the database:
a plurality of degree program identifiers; and
a degree program content stored in association with each of the plurality of program identifiers; and
receiving, by the server from the second GUI:
a request to display the degree program identifiers and the degree program content on a third GUI; and
a selection of a degree identifier;
generating, by the server, the third GUI displaying the degree program identifiers and the degree program content; and
transmitting, by the server, the third GUI to the second client device for display.

14. The method of claim 13, further comprising the steps of:
storing, by the server in the database, at least one degree program filter factor associated with at least one degree program identifier in the plurality of degree program identifiers;
generating, by the server on the third GUI, at least one degree program filter GUI component receiving, as input, a selection of the at least one degree program filter factor;
executing, by the server, a database command selecting, from the database, the at least one degree program identifier, wherein the at least one degree program identifier is associated in the database with the at least one degree program filter factor;
re-generating, by the server, the degree program identifier and the degree program content; and
displaying, by the server, the re-generated degree program identifier and the degree program content on the third GUI.

15. The method of claim 7, further comprising the step of generating, by the server, a third GUI comprising:
a degree identifier GUI component receiving, as input, at least one degree identifier;
a degree detail GUI component receiving, as input, at least one degree detail associated in the database with the degree identifier;

a degree program identifier GUI component receiving, as input, at least one degree program identifier; and a degree program detail GUI component receiving, as input, at least one degree program detail associated in the database with the degree program identifier.

16. A system comprising a server, the server comprising a computing device coupled to a network and including at least one processor executing instructions within memory, the server being configured to:

generate a first Graphical User Interface (GUI) comprising:

a plurality of survey questions, each associated with a degree factor in a plurality of degree factors stored in a database; and a factor rating GUI component for each of the plurality of survey questions, the factor rating indicating a level to which the degree factor applies to a user;

transmit the first GUI to a first client device;

receive, from the first client device, a first response comprising the factor rating for each of the plurality of survey questions, the first response associated with a first user;

identify, within the first response, at least one high factor rating comprising the factor rating exceeding a factor rating threshold stored in the database;

execute a database command selecting, from the database, at least one degree identifier sharing at least one common high factor rating between the first response and at least one response stored in the database, wherein the at least one response is associated with a second user;

generate a candidate degree list comprising the at least one degree identifier;

generate a second GUI comprising the candidate degree list; and transmit the second GUI to the first client device.

17. The system of claim 16, wherein the server is further configured to:

store, within the database, at least one degree filter factor associated with the at least one degree in the candidate degree list;

generate a degree filter GUI component on the second GUI, or a third GUI comprising at least one degree filter GUI component receiving, as input, a selection of the at least one degree filter factor;

execute a database command selecting, from the database, the at least one degree identifier, wherein the at least one degree identifier is associated in the database with the at least one degree filter factor;

re-generate the degree candidate list; and display the re-generated degree candidate list on the second GUI.

18. The system of claim 16, wherein the server is further configured to:

store, within the database:

a plurality of degree program identifiers; and a degree program content stored in association with each of the plurality of program identifiers; and receive, from the second GUI:

a request to display the degree program identifiers and the degree program content on a third GUI; and a selection of a degree identifier;

generate the third GUI displaying the degree program identifiers and the degree program content; and transmit the third GUI to the second client device for display.

19. The system of claim 18, wherein the server is further configured to:

store in the database, at least one degree program filter factor associated with at least one degree program identifier in the plurality of degree program identifiers;

generate, on the third GUI, at least one degree program filter GUI component receiving, as input, a selection of the at least one degree program filter factor;

execute a database command selecting, from the database, the at least one degree program identifier, wherein the at least one degree program identifier is associated in the database with the at least one degree program filter factor;

re-generate the degree program identifier and the degree program content; and display the re-generated degree program identifier and the degree program content on the third GUI.

20. The system of claim 1, wherein the first user is a previous student and the second user is a prospective student.

* * * * *